(12) United States Patent
Yoneyama

(10) Patent No.: US 8,929,598 B2
(45) Date of Patent: Jan. 6, 2015

(54) TRACKING APPARATUS, TRACKING METHOD, AND STORAGE MEDIUM TO STORE TRACKING PROGRAM

(75) Inventor: Hisashi Yoneyama, Hachioji (JP)

(73) Assignee: Olympus Imaging Corp. (JP)

( * ) Notice: Subject to any disclaimer, the term of this patent is extended or adjusted under 35 U.S.C. 154(b) by 192 days.

(21) Appl. No.: 13/534,075

(22) Filed: Jun. 27, 2012

(65) Prior Publication Data

US 2013/0004020 A1 Jan. 3, 2013

(30) Foreign Application Priority Data

Jun. 29, 2011 (JP) ................................. 2011-144771
Jun. 29, 2011 (JP) ................................. 2011-144772

(51) Int. Cl.
*G06K 9/00* (2006.01)
*H04N 5/232* (2006.01)

(52) U.S. Cl.
CPC ....... *H04N 5/23219* (2013.01); *H04N 5/23216* (2013.01); *G06K 9/00234* (2013.01); *H04N 5/23212* (2013.01); *H04N 5/23293* (2013.01)
USPC .......... 382/103; 382/115; 382/118; 340/5.52; 340/5.81

(58) Field of Classification Search
USPC .......... 382/103, 209, 219, 278; 348/143, 144, 348/152, 611
See application file for complete search history.

(56) References Cited

U.S. PATENT DOCUMENTS

| | | | | |
|---|---|---|---|---|
| 6,964,023 B2 * | 11/2005 | Maes et al. | ..................... | 715/811 |
| 7,103,227 B2 * | 9/2006 | Raskar et al. | ................. | 382/266 |
| 7,489,803 B2 * | 2/2009 | Haynes et al. | ................ | 382/103 |
| 7,689,010 B2 * | 3/2010 | Canzler et al. | ................ | 382/118 |
| 8,064,639 B2 * | 11/2011 | Swaminathan et al. | ...... | 382/103 |
| 8,253,891 B2 * | 8/2012 | Yu et al. | ......................... | 349/106 |
| 8,432,475 B2 * | 4/2013 | Fujita et al. | .............. | 348/333.02 |
| 8,447,132 B1 * | 5/2013 | Galil | .............................. | 382/274 |
| 8,466,981 B2 * | 6/2013 | Okamoto | ................... | 348/222.1 |
| 8,553,037 B2 * | 10/2013 | Smith et al. | ................... | 345/473 |
| 8,564,667 B2 * | 10/2013 | Yun | .............................. | 348/159 |
| 8,571,258 B2 * | 10/2013 | Faure et al. | ................... | 382/103 |
| 8,792,679 B2 * | 7/2014 | Sengupta et al. | ............ | 382/103 |

FOREIGN PATENT DOCUMENTS

| | | |
|---|---|---|
| CN | 101656830 A | 2/2010 |
| CN | 101960834 A | 1/2011 |
| JP | 2605004 | 2/1997 |

(Continued)

OTHER PUBLICATIONS

Office Action mailed in corresponding Chinese Patent Application No. 2012102249842 on Jul. 8, 2014, consisting of 28 pp. (English Translation Provided).

*Primary Examiner* — Yosef Kassa
(74) *Attorney, Agent, or Firm* — Volpe and Koenig, P.C.

(57) ABSTRACT

A tracking apparatus includes a face detection unit, a face corresponding region detection unit, a face tracking unit, a peripheral part tracking unit, a tracking switch unit. The face tracking unit tracks the face in accordance with a result detected by the face detection unit or a result detected by the face corresponding region detection unit. The peripheral part tracking unit tracks, as a part other than the face, a part of the subject having a preset positional relationship with the face. The tracking switch unit switches to the tracking of a part other than the face by the peripheral part tracking unit when the face is not tracked by the face tracking unit.

20 Claims, 11 Drawing Sheets

(56) References Cited

FOREIGN PATENT DOCUMENTS

| JP | 2000105819 A | 4/2000 |
| JP | 200672770 A | 3/2006 |
| JP | 2006211139 A | 8/2006 |
| JP | 2009-268086 | 11/2009 |
| JP | 2010074815 A | 4/2010 |
| WO | 2009110348 A1 | 9/2009 |

* cited by examiner

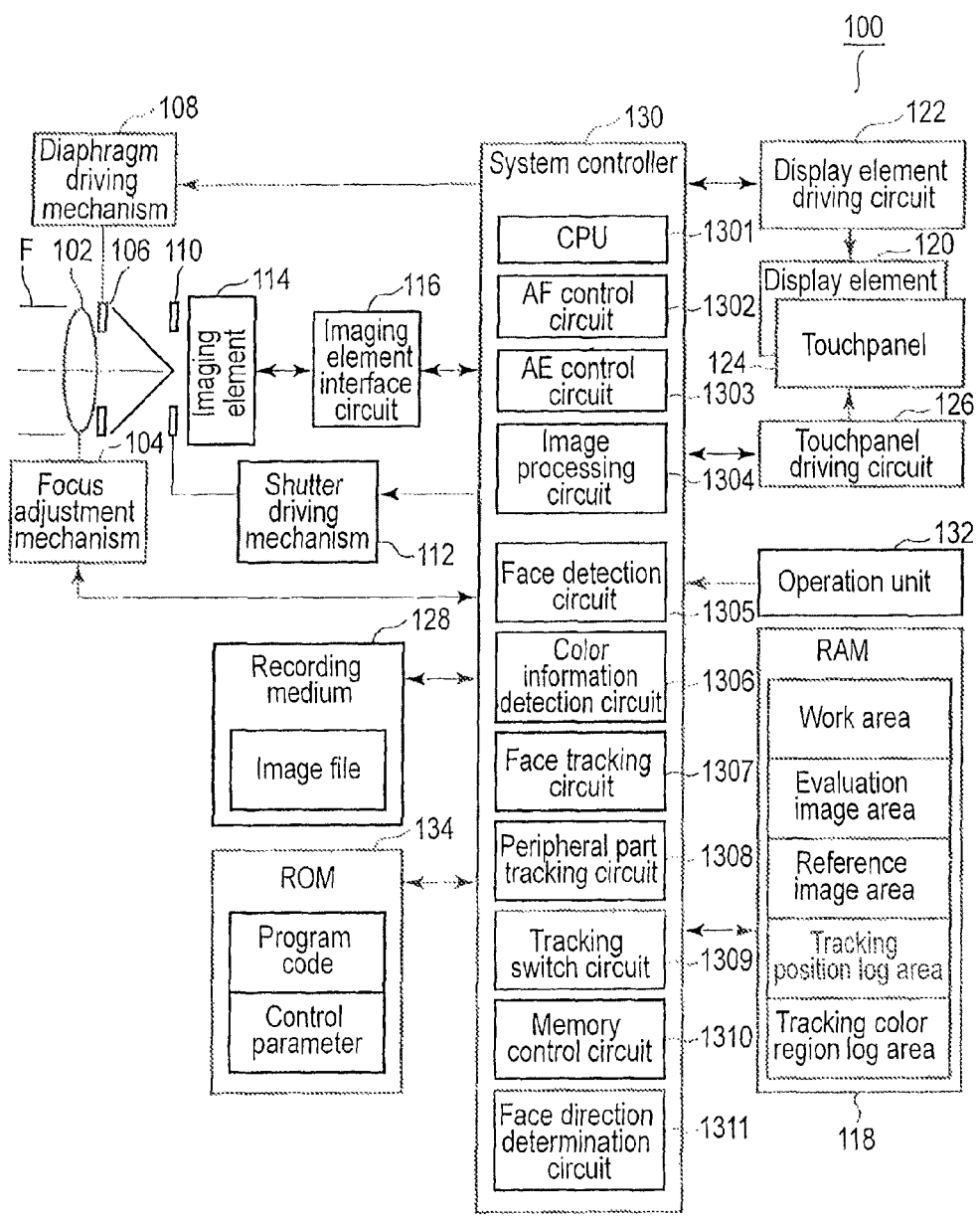
F I G. 1

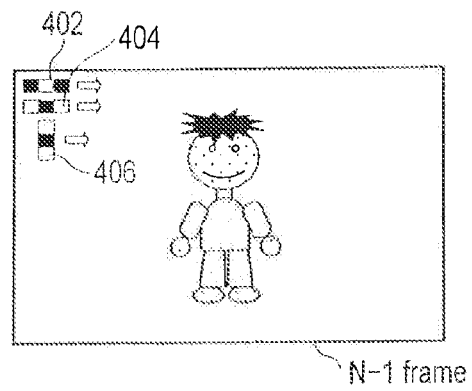
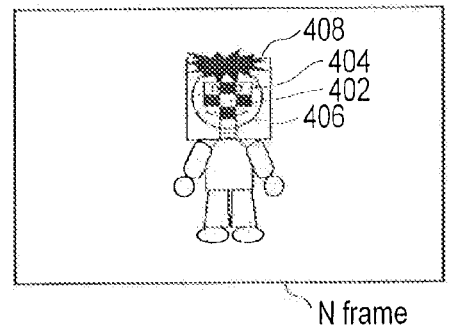
FIG. 2A                    FIG. 2B
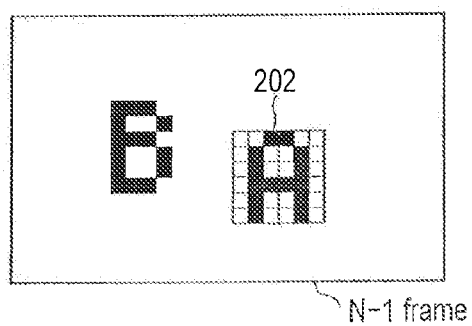
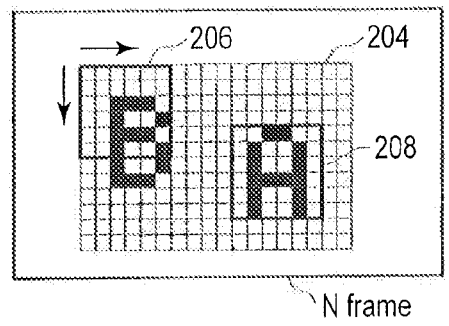
FIG. 3A                    FIG. 3B
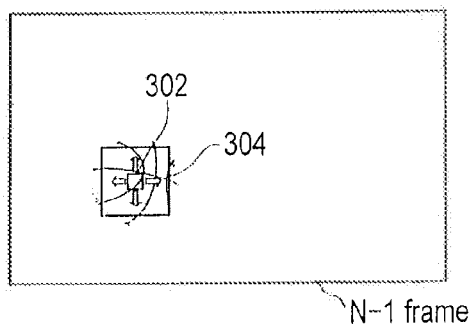
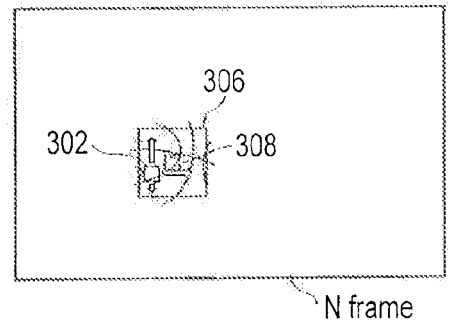
FIG. 4A                    FIG. 4B

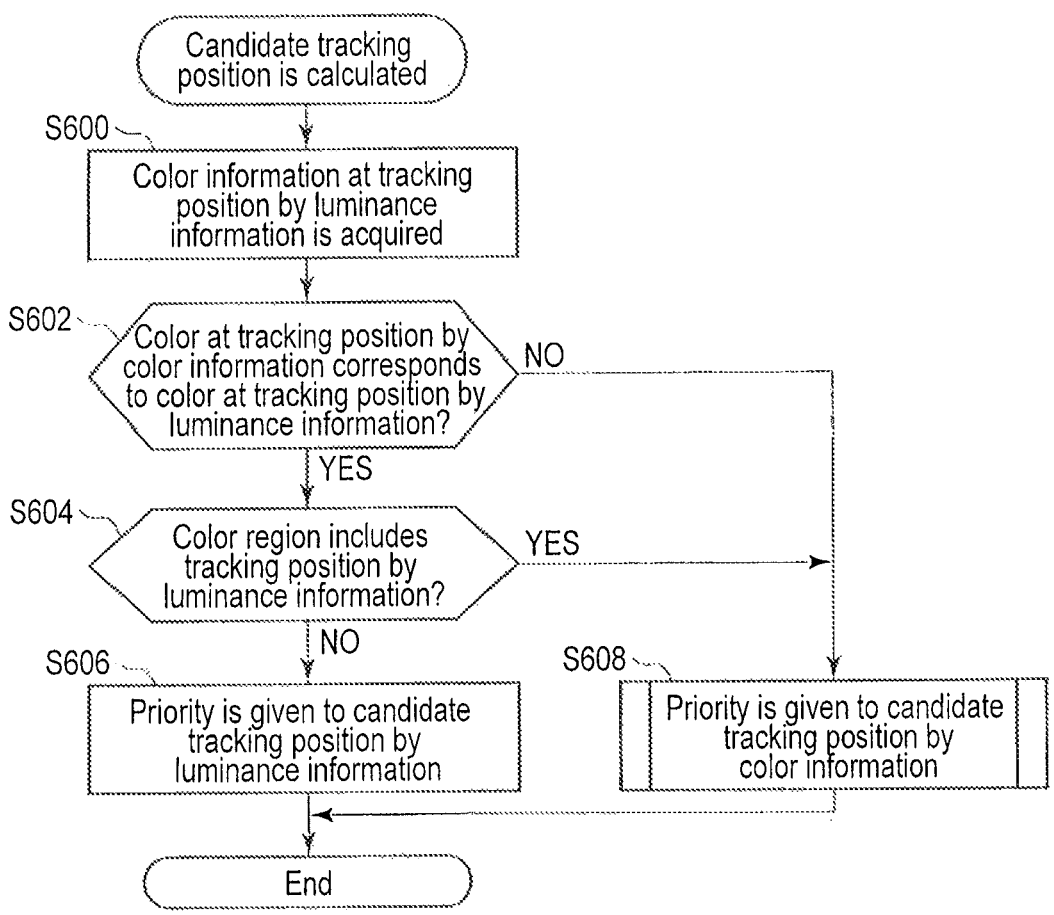
F I G. 14

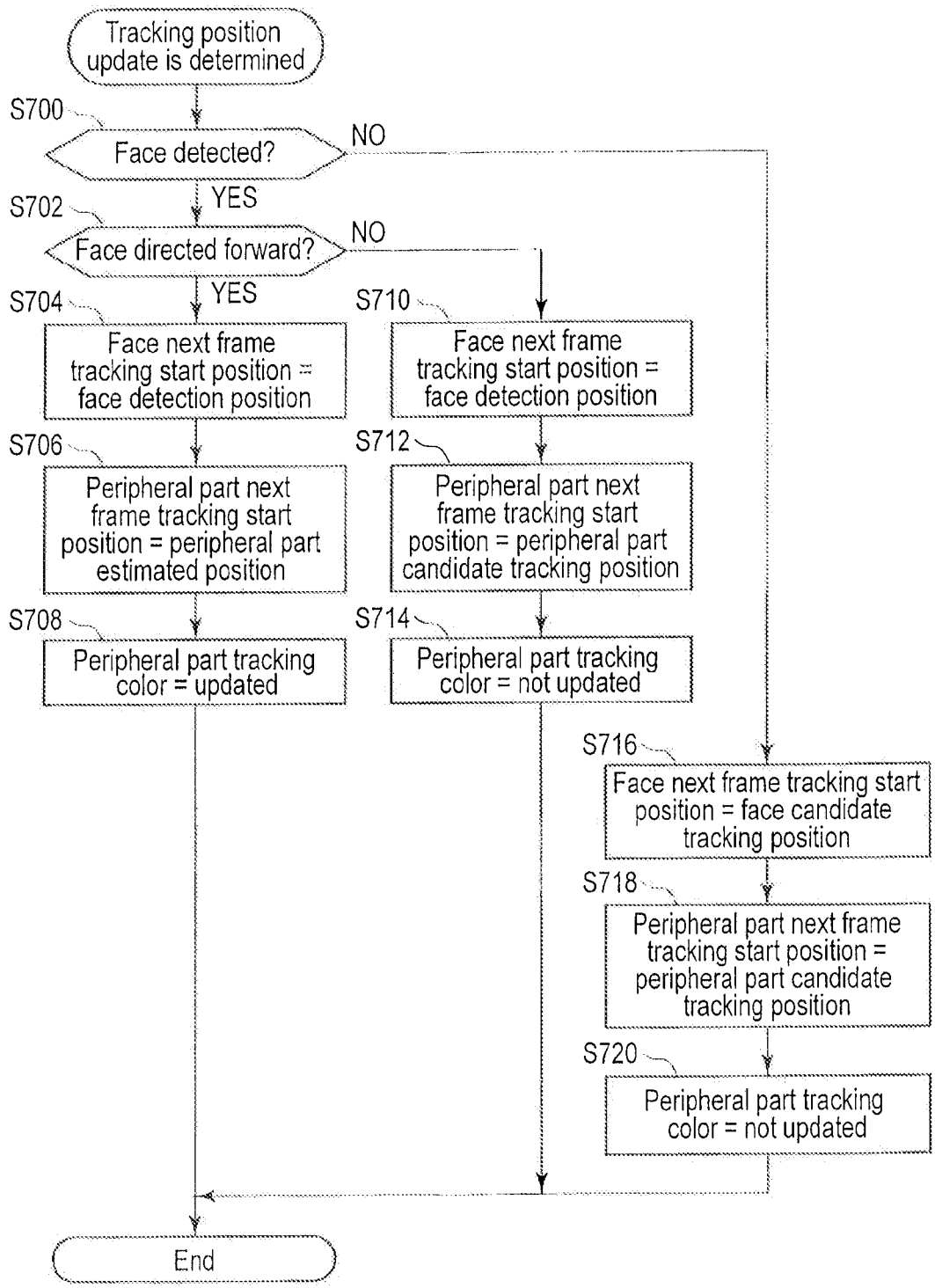
F I G. 15

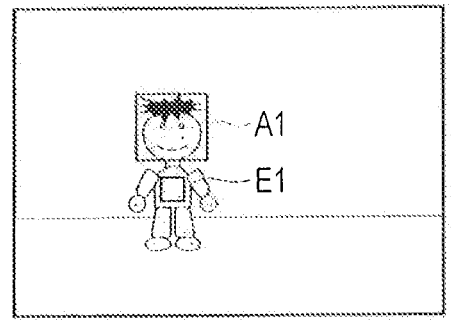
F I G. 16A
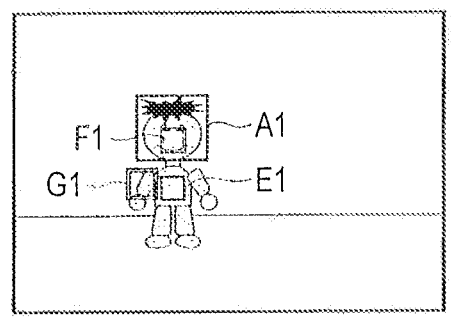
F I G. 16B
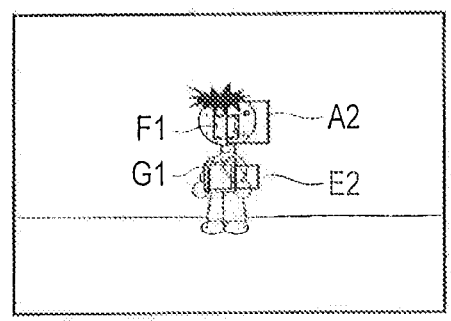
F I G. 16C
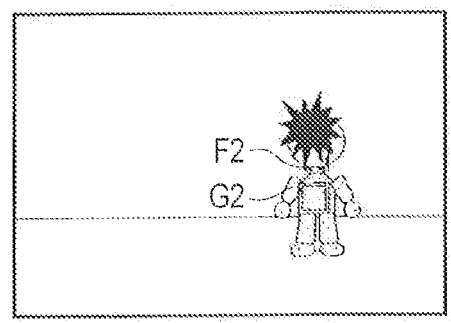
F I G. 16D

US 8,929,598 B2

TRACKING APPARATUS, TRACKING METHOD, AND STORAGE MEDIUM TO STORE TRACKING PROGRAM

CROSS-REFERENCE TO RELATED APPLICATIONS

This application is based upon and claims the benefit of priority from prior Japanese Patent Applications No. 2011-144771, filed Jun. 29, 2011; and No. 2011-144772, filed Jun. 29, 2011, the entire contents of all of which are incorporated herein by reference.

BACKGROUND OF THE INVENTION

1. Field of the Invention

The present invention relates to a tracking apparatus for tracking a subject such as a person, tracking method, and a storage medium to store a tracking program.

2. Description of the Related Art

It has heretofore been known to use a technique for performing automatic focus control (AF) and automatic exposure control (AE) to track a particular subject when photographing a subject such as a moving body or when obtaining moving images. Such photography uses a tracking process for tracking the particular subject. There are various types of tracking processes, such as a tracking process that use image data luminance information, a tracking process that use color information, and a tracking process that use face detection.

BRIEF SUMMARY OF THE INVENTION

A tracking apparatus according to aspect of the present invention comprises a face detection unit which detects a face of a subject from image data containing the subject; a face corresponding region detection unit which detects a region corresponding to the face in the image data; a face tracking unit which tracks the face in accordance with a result detected by the face detection unit or a result detected by the face corresponding region detection unit; a peripheral part tracking unit which tracks, as a part other than the face, a part of the subject having a preset positional relationship with the face; and tracking switch unit which switches to the tracking of a part other than the face by the peripheral part tracking unit when the face is not tracked by the face tracking unit.

A tracking method according to aspect of the present invention comprises causing a face detection unit to detect a face of a subject from image data containing the subject; causing a face corresponding region detection unit to detect a region corresponding to the face in the image data; causing a face tracking unit to track the face in accordance with a result detected by the face detection unit or a result detected by the face corresponding region detection unit; causing a peripheral part tracking unit to track, as a part other than the face, a part of the subject having a preset positional relationship with the face; and switching to the tracking of a part other than the face by the peripheral part tracking unit when the face is not tracked by the face tracking unit.

A storage medium to store a tracking program processable by a computer, the tracking program according to aspect of the present invention comprises a face detection function which detects a face of a subject from image data containing the subject; a face corresponding region detection function which detects a region corresponding to the face in the image data; a face tracking function which tracks the face in accordance with a result detected by the face detection function or a result detected by the face corresponding region detection function; a peripheral part tracking function which tracks, as a part other than the face, a part of the subject having a preset positional relationship with the face; and a tracking switch function which switches to the tracking of a part other than the face by the peripheral part tracking function when the face is not tracked by the face tracking function.

An imaging device according to aspect of the present invention comprises an imaging unit which images a subject and then outputs image data; a face detection unit which detects a face of the subject from the image data; a face tracking unit which tracks the face of the subject in the image data in accordance with the image data; a peripheral part tracking unit which tracks a face peripheral part of the subject in the image data in accordance with the image data; a display unit which displays an image based on the image data; and a control unit, the control unit superposing a display frame indicating the position of the face on the image displayed on the display unit when the detection of the face by the face detection unit or the tracking of the face by the face tracking unit is effective, the control unit superposing a display frame indicating the position of the face peripheral part on the image displayed on the display unit when the detection of the face by the face detection unit and the tracking of the face by the face tracking unit are ineffective.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block configuration diagram showing one embodiment of an imaging device comprising a tracking apparatus according to the present invention;

FIG. 2A is a diagram showing face parts used in face detection by a face detection circuit in the tracking apparatus;

FIG. 2B is a diagram showing how the face parts are used to detect a face by the face detection circuit in the tracking apparatus;

FIG. 3A is a diagram showing standard image data when luminance information by the face detection circuit in the tracking apparatus is used to track the face;

FIG. 3B is a diagram showing the search of a region corresponding to the standard image data when the luminance information by the face detection circuit in the tracking apparatus is used to track the face;

FIG. 4A is a diagram showing a region specified when color information by the face detection circuit in the tracking apparatus is used to track the face;

FIG. 4B is a diagram illustrating a search when the color information by the face detection circuit in the tracking apparatus is used to track the face;

FIG. 14 is a flowchart of a face candidate tracking position calculating process and a peripheral part candidate tracking position calculating process in the tracking apparatus;

FIG. 15 is a flowchart of a tracking position update determination process in the tracking apparatus;

FIG. 16A is a diagram showing the detection of a face by the tracking position update determination process in the tracking apparatus;

FIG. 16B is a diagram showing the result of face tracking by the tracking position update determination process in the tracking apparatus;

FIG. 16C is a diagram illustrating tracking when the face detected by the tracking position update determination process in the tracking apparatus is turned aside;

FIG. 16D is a diagram illustrating tracking when the face detected by the tracking position update determination process in the tracking apparatus is turned back;

DETAILED DESCRIPTION OF THE INVENTION

Figure 5:
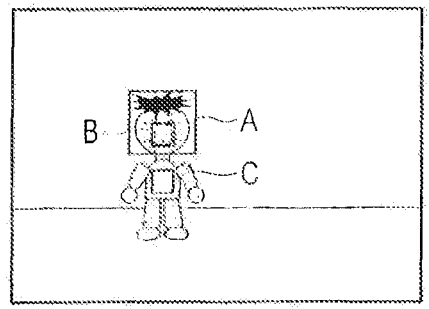
FIG. 5 is a diagram showing a face detection position, a face tracking position, and a periphery tracking position for a subject in the tracking apparatus.

Hereinafter, on embodiment of the present invention will be described with reference to the drawings.

FIG. 1 is a block configuration diagram showing an example of an imaging device comprising a tracking apparatus. An imaging device 100 includes a photographic optical system 102, a focus adjustment mechanism 104, a diaphragm 106, a diaphragm driving mechanism 108, a shutter 110, a shutter driving mechanism 112, an imaging element 114, an imaging element interface circuit 116, a RAM 118, a display element 120, a display element driving circuit 122, a touchpanel 124, a touchpanel driving circuit 126, a recording medium 128, a system controller 130, an operation unit 132, and a ROM 134.

The system controller 130 is equipped with a CPU 1301 as a computer.

The photographic optical system 102 focuses a light flux F from a subject on a light receiving surface of the imaging element 114. The photographic optical system 102 includes a plurality of lenses such as a focus lens. The focus adjustment mechanism 104 includes a motor and its driving circuit, and drives the focus lens in the photographic optical system 102 in its optical axis direction (chain line direction shown) under the control of the CPU 1301.

The diaphragm 106 is configured to open/close, and adjusts the amount of the light flux F entering the imaging element 114 via the photographic optical system 102. The diaphragm driving mechanism 108 includes a driving mechanism for driving the diaphragm 106, and drives the diaphragm 106 under the control of the CPU 1301.

The shutter 110 blocks or exposes the light receiving surface of the imaging element 114 to adjust the exposure time of the imaging element 114. The shutter driving mechanism 112 includes a driving mechanism for driving the shutter 110, and drives the shutter 110 under the control of the CPU 1301.

The imaging element 114 includes the light receiving surface on which the light flux F from a subject such as a person and its background focused via the photographic optical system 102 is formed into an image. The light receiving surface of the imaging element 114 comprises a plurality of two-dimensionally arranged pixels. A color filter is provided on the light entrance side of the light receiving surface of the imaging element 114.

The imaging element 114 converts the figure (subject figure) corresponding to the light flux F formed into the image on the light receiving surface to an electric signal (hereinafter referred to as an image signal) corresponding to the light amount. Regarding the imaging element 114, imaging elements having various configurations are known, such as a CCD imaging element and a CMOS imaging element. Regarding the color arrangement of the color filter, various arrangements such as a bayer arrangement are known. The present embodiment is not limited to a particular configuration of the imaging element 114 and can use imaging elements having various configurations.

The imaging element interface circuit 116 drives the imaging element 114 under the control of the CPU 1301. The imaging element interface circuit 116 reads the image signal obtained by the imaging element 114 under the control of the CPU 1301, and subjects the read image signal to analog processing such as correlated double sampling (CDS) and automatic gain control (AGC). The imaging element interface circuit 116 converts the analog-processed image signal to a digital signal (hereinafter referred to as image data).

The RAM 118 has, for example, an SDRAM. The RAM 118 includes a work area, an evaluation image area, reference image area, a tracking position log area, and a tracking color region log area that are formed as storage areas.

The work area temporarily stores data including the image data obtained by the imaging element interface circuit 116, for example, data generated in each section of the imaging device 100.

The evaluation image area temporarily stores evaluation image data. The evaluation image data is image data for a frame containing a subject which is a tracking target in a tracking process. The tracking process is conducted to track the tracking target.

The reference image area temporarily stores reference image data. The reference image data is image data for a search target frame of the tracking target in the tracking process. In the tracking process, the reference image data is searched.

The tracking position log area temporarily stores a tracking position log. The tracking position log is a log in which a tracking position obtained as a result of the tracking process is recorded. In the present embodiment, a plurality of tracking processes are used together to track the tracking target. Therefore, for example, the past ten frames of tracking positions obtained by the respective tracking processes are individually recorded in the tracking position log. A final tracking position adopted by a later-described priority tracking position determination process is also recorded in the tracking position log.

The tracking color region log area temporarily stores a tracking color region log. The tracking color region log is a log in which a tracking color region obtained by the tracking process is recorded. In the present embodiment, for example, the past ten frames of tracking color regions are individually recorded.

The display element 120 has, for example, a liquid crystal display (LCD). The display element 120 displays various images such as images for live view, and images recorded in the recording medium 128. The display element driving circuit 122 drives the display element 120 in accordance with the image data input from the CPU 1301 of the system controller 130, and displays images on the display element 120.

The touchpanel 124 is integrally formed on a display screen of the display element 120. The touchpanel 124 detects, for example, a contact position of the finger of a user on the display screen.

The touchpanel driving circuit 126 drives the touchpanel 124, and outputs, to the CPU 1301, a contact detection signal from the touchpanel 124. The CPU 1301 detects the user's contact operation on the display screen from the contact detection signal, and performs processing corresponding to the contact operation.

The recording medium 128 has, for example, a memory card. An image file obtained by photography operation is recorded in the recording medium 128. The image file comprises image data and a predetermined header attached thereto. For example, data indicating a photography condition and data indicating a tracking position are recorded in the header as tag data.

The system controller 130 controls the operation of the imaging device 100. The system controller 130 includes the CPU 1301, an AF control circuit 1302, an AE control circuit 1303, an image processing circuit 1304, a face detection circuit 1305, a color information detection circuit 1306, a face tracking circuit 1307, a peripheral part tracking circuit 1308, a tracking switch circuit 1309, a memory control circuit 1310, and a face direction determination circuit 1311.

The CPU 1301 controls the operations of functional blocks outside the system controller 130 such as the focus adjustment mechanism 104, the diaphragm driving mechanism 108, the shutter driving mechanism 112, the display element driving circuit 122, and the touchpanel driving circuit 126, and the operations of the circuits inside the system controller 130.

The AF control circuit 1302 controls a contrast AF process. More specifically, the AF control circuit 1302 extracts a high-frequency component of the image data obtained by the imaging element interface circuit 116, and accumulates the extracted high-frequency component to acquire an in-focus evaluation value for AF. The CPU 1301 evaluates the contrast of the image data in accordance with the acquired in-focus evaluation value, and at the same time, control the focus adjustment mechanism 104, thereby bringing the focus lens into focus.

The AE control circuit 1303 controls AE operation. More specifically, the AE control circuit 1303 calculates subject luminance by using the image data obtained by the imaging element interface circuit 116. In accordance with the calculated subject luminance, the CPU 1301 calculates, for example, an opening value (aperture value) of the diaphragm 106 during exposure, a release time (shutter speed value) of the shutter 110, imaging element sensitivity, and ISO.

The image processing circuit 1304 performs various kinds of image processing for the image data obtained by the imaging element interface circuit 116. The image processing includes, for example, color correction processing, gamma (γ) correction processing, and compression processing. The image processing circuit 1304 also expands compressed image data.

The face detection circuit 1305 detects, from the image data containing a subject such as a person, the face of the subject. The face detection circuit 1305 finds the amount of correlation between image data obtained by each frame and face parts 402, 404, and 406 shown in FIG. 2A. Face part 402 is image data corresponding to a shade pattern around the nose of the person. Face part 404 is image data corresponding to a shade pattern around the eyes of the person. Face part 406 is image data corresponding to a shade pattern around the mouth of the person. The amount of correlation between the image data and face parts 402, 404, and 406 is maximized at a predetermined arrangement that indicates the face of the person shown in FIG. 2B. Here, the face of the person is present in a region 408 including face parts 402, 404, and 406. The sizes of face parts 402, 404, and 406 may be changed in accordance with the size of a preset search face. The face region is rectangular in FIG. 2B, but may otherwise be circular.

The color information detection circuit 1306 detects a region having color information such as a flesh color corresponding to the face detected by the face detection circuit 1305 in the image data. The color information detection circuit 1306 detects a region having color information such as a flesh color corresponding to a peripheral part other than the face of the subject in the image data. The peripheral part other than the face of the subject is detected by the peripheral part tracking circuit 1308.

The face tracking circuit 1307 tracks the face in accordance with luminance information (first luminance tracking unit) for the face detected by the face detection circuit 1305, or the region having the color information such as the flesh color corresponding to the face detected by the color information detection circuit 1306 (first color tracking unit). The face tracking circuit 1307 tracks the face in such a manner as to give priority to the detection of the face by the face detection circuit 1305 over the detection of the region having the color information such as the flesh color by the color information detection circuit 1306.

The face tracking is described. The face tracking circuit 1307 performs the tracking process by using luminance information for the image data. In the tracking process that uses the luminance information, when a subject as a tracking target is set, for example, in an N−1 frame shown in FIG. 3A, image data in the N−1 frame is stored in the evaluation image area of the RAM 118 evaluation image data. Image data in a predetermined range 202 of the evaluation image data including the tracking target is set as standard image data. Subsequently, in the tracking process, a part corresponding to the standard image data 202 is searched for in reference image data to be an N frame shown in FIG. 3B.

If the tracking process of the N frame is shown by way of example, the face tracking circuit 1307 stores the image data for the N frame in the reference image area of the RAM 118 as reference image data. The face tracking circuit 1307 finds the amount of correlation between image data in a predetermined search range 204 of the reference image data and the standard image data 202, and thereby searches for a part of the reference image data corresponding to the standard image data 202. The correlation amount is determined, for example, from a difference absolute value sum between the standard image data and the reference image data. The difference absolute value sum is the accumulation or absolute values of luminance differences found for the respective pixels.

For example, if the difference absolute value sum between the reference image data region 206 of the reference image data shown in FIG. 3B and the standard image data 202 is found, region 206 of the reference image data and the standard image data 202 are obviously different image data, so that the difference absolute value sum is great. In contrast, if the difference absolute value sum between a region 208 of the reference image data and the standard image data 202 is found, the difference absolute value sum is small.

Thus, the difference absolute value sum is smaller when the amount of correlation with the standard image data 202 is greater. In the tracking process that uses the luminance information, a region having the maximum correlation amount, that is, the minimum difference absolute value sum is searched for from the reference image data. In the example shown in FIG. 2B, region 208 searched for as the part corresponding to the standard image data 202.

In the tracking position log area, a position having the highest correspondence in region 208 is recorded as a tracking position. When there are a plurality of such positions having high correspondence, for example, a position close to the center of region 208 is set as a tracking position. In the next tracking process, this tracking position is preferably used as the start position of the tracking process. This can reduce the time required for the tracking process.

The face tracking circuit 1307 performs the tracking process by using the color information for the flesh color in the image data. In the tracking process that uses the color information for the flesh color, a region that can be determined to have the same color as the color set in the evaluation image data is searched for as a tracking color region. When a given position 302 of the subject is specified in the N−1 frame as shown in FIG. 4A, the face tracking circuit 1307 acquires the color information for the position 302 in the evaluation image data. The face tracking circuit 1307 uses the position 302 as the start position of the tracking process, and searches for a region having the same color information as the position 302.

More specifically, the face tracking circuit 1307 sequentially acquires the color information for the flesh color so that the position 302 is directed to the periphery from the start position. The face tracking circuit 1307 includes the acquired color information in the region when this color information can be determined to be the same as the color information for the position 302. The face tracking circuit 1307 does not include the acquired color information in the region when this color information cannot be determined to be the same as the color information for the position 302.

As a result of searching for the tracking color region in this way, a rectangular region 304 inscribed in the subject is the tracking color region, for example, when the subject has a single color as shown in FIG. 4A. The tracking position to be recorded in the tracking position log area is, for example, the position of the center of gravity (which is the same as the position 302 in the example shown in FIG. 4A) of the rectangular region 304, the next tracking process, this tracking position is used as the start position of the tracking process.

If the tracking process of the N frame is shown by way of example, the face tracking circuit 1307 uses, as the start position of the tracking process, the tracking position 302 of the N−1 frame in a predetermined search range of the image data of the N frame stored as the reference image data shown in FIG. 4B. The face tracking circuit 1307 then searches for, as tracking color regions, regions which can be determined to have the same color as the color of the tracking color region 304, sequentially from the periphery of the tracking position 302. In the example shown in FIG. 45, a region 306 is the tracking color region. In the example shown in FIG. 4B, a position of the center of gravity 308 is set as a tracking position, and the tracking position 308 is recorded in the tracking position log area. In the tracking color region log area, information indicating the range of the tracking color region 306, for example, the positions of four corners are recoded.

The peripheral part tracking circuit 1308 tracks a peripheral part other than the face of the subject. In the same manner as the face tracking circuit 1307, the peripheral part tracking circuit 1308 tracks a peripheral part (second color tracking unit) by using the luminance information (second luminance tracking unit) for the image data and the color information for the flesh color. For example, the peripheral part tracking circuit 1308 tracks, as a part other than the face, the trunk of the subject having a preset positional relationship with the face, more specifically, the breast in the trunk.

The positional relationship between the face and the breast is set so that the breast is at the position located a preset distance below the face when parts located preset distances below the face of the subject on the image data, that is, parts below the face of the person are the neck, breast, abdomen, and leg. The peripheral part is not exclusively the face of the subject, and may otherwise be, for example, the neck, abdomen, leg, or arm.

FIG. 5 shows a face detection position A, a face tracking position B, and a periphery tracking position C for the subject. The face detection position A indicates the face detected by the face detection circuit 1305, and corresponds to, for example, the rectangular region 408 shown in FIG. 2.

The face tracking position B indicates a position for tracking the face in accordance with the region having the color information for the flesh color corresponding to the face detected by the color information detection circuit 1306, and corresponds to, for example, the position of the center of gravity 302 or 308 of the tracking color region 304 shown in FIG. 4A and FIG. 4B. The face tracking position B is recorded in the tracking position log area as described above.

The periphery tracking position C indicates a peripheral part other than the face of the subject to be tracked by the peripheral part tracking circuit 1308, for example, the breast. This periphery tracking position C indicates the breast of the subject, for example, by a rectangular frame. This periphery tracking position C is not exclusively the rectangular frame, and may otherwise be, for example, a circular frame.

Figure 6:
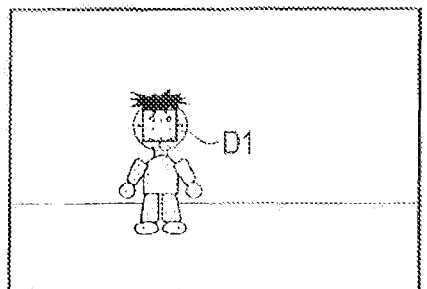
FIG. 6 is a diagram showing a face tracking frame set in the front part of the face in the tracking apparatus.
Figure 7:
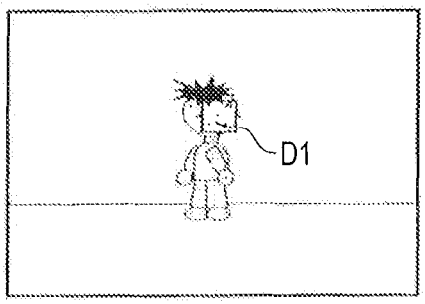
FIG. 7 is a diagram showing a face tracking frame set in the side part of the face in the tracking apparatus.

The face tracking circuit 1307 displays, on the display element 120 which is, for example, the LCD, a rectangular face tracking frame D1 as shown in FIG. 6 or FIG. 7 when tracking the face in accordance with the region having the color information for the flesh color corresponding to the face detected by the face detection circuit 1305 or the face detected by the color information detection circuit 1306. FIG. 6 shows the face tracking frame D1 set in the front part of the face. FIG. 7 shows the face tracking frame D1 set in the side part of the face. The face tracking frame D1 is not exclusively the rectangular frame, and may otherwise be a circular frame. Either the front pa or side part of the face is tracked as a face.

Figure 8:
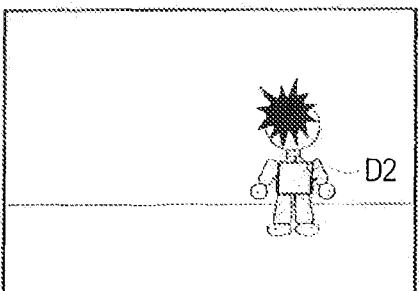
FIG. 8 is a diagram showing a breast tracking frame fog tracking the breast by a peripheral part tracking circuit in the tracking apparatus.

The peripheral part tracking circuit 1308 displays, on the display element 120 which is, for example, the LCD, a rectangular breast tracking frame D2 as shown in FIG. 8 when tracking the breast as a peripheral part other than the face of the subject. The breast tracking frame D2 is not exclusively the rectangular frame, and may otherwise be a circular frame.

When the face cannot be tracked by the face tracking circuit 1307, the tracking switch circuit 1309 switches to the tracking of a part other than the face by the peripheral part tracking circuit 1308 from the tracking of the face by the display of the face tracking frame D1, for example, as shown in FIG. 6 or FIG. 7. More specifically, the tracking switch circuit 1309 switches to the tracking of the breast, for example, shown in FIG. 8 from the tracking of the face by the display of the face tracking frame D1, and displays, on the display element 120 which is, for example, the LCD, the rectangular breast tracking frame D2 on the breast as shown in FIG. 8.

When the face or the color information for the flesh color corresponding to the face is detected at a position estimated to be the face from the part other than the face, for example, from the breast, the tracking switch circuit 1309 returns to the tracking of the face (the display of the face tracking frame D1) by the face tracking circuit 1307 shown in FIG. 6 or FIG. 7 from the tracking of the breast (the display of the breast tracking frame D2) by the peripheral part tracking circuit 1308 shown in FIG. 8.

The positional relationship between the face and the breast is set so that the breast is located a preset distance below the face of the subject on the image data. That is, if the neck, breast, abdomen, and leg are located below the face of the person, the face can be estimated to be located a preset distance above the breast of the subject.

The tracking switch circuit 1309 previously stores the color information for the flesh color corresponding to the face. When the color information at a position estimated to be the face corresponds to the previously stored color information, the tracking switch circuit 1309 determines that the color information for the flesh color corresponding to the face has been detected, and then returns to the tracking of the face by the face tracking circuit 1307.

When the face is not detected by at least the face detection circuit 1305 and when the region having the color information for the flesh color is not detected by the color information detection circuit 1306, the tracking switch circuit 1309 determines that the face cannot be tracked by the face tracking circuit 1307.

If the performance of the tracking has deteriorated because the face is not detected in the image data and the face cannot be tracked in accordance with the region having the color information for the flesh color, the tracking switch circuit 1309 determines that the face cannot be tracked by the face tracking circuit 1307.

The memory control circuit 1310 is an interface which controls the access to the RAM 118, the recording medium 128, and the ROM 134 by the CPU 1301.

The operation unit 132 includes various operation members to be operated by the user. For example, the operation unit 132 includes a release button, a moving image button, a mode dial, a selection key, and a power supply button.

The release button includes a first release switch and a second release switch. The first release switch is turned on when the release button is pressed halfway by the user. When the first release switch is turned on, photographic preparation operation such as an AF process is performed. The second release switch is turned on when the release button is fully pressed by the user. When the second release switch is turned on, exposure operation for still image photography is performed.

The moving image button is an operation member for indicating the start or end of moving image photography. If the moving image button is pressed by the user, a moving image photography process is started. If the moving image button is pressed during the execution of the moving image photography process, the moving image photography process is ended.

The mode dial is an operation member for selecting a photography setting of the imaging device. In the present embodiment, the mode dial can select, for example, a still image photography mode and a moving image photography mode as the photography setting of the imaging device. The still image photography mode a photography setting for still image photography. The moving image photography mode is a photography setting for moving image photography.

The selection key is an operation member for selecting or deciding an item, for example, on a menu screen. If the selection key is operated by the user, an item is selected or decided on the menu screen.

The power supply button is an operation member for turning on or off the power supply of the imaging device. If the power supply button is operated by the user, the device 100 is activated and becomes operable. If the power supply button is operated while the imaging device is activated, the device 100 is set to a power saving standby state. The ROM 134 is a recording medium for storing a program code for the CPU 1301 to perform various kinds of processing. The program code includes a tracking program code for tracking a subject. The tracking program enables the CPU 1301 as a computer to perform a face detection function, a face corresponding region detection function, a face tracking function, a peripheral part tracking function, and a tracking switch function. The face detection function detects the face of the subject from the image data containing the subject. The face corresponding region detection function detects a region corresponding to the face in the image data. The face tracking function tracks the face in accordance with the result detected by the face detection unit or the result detected by the face corresponding region detection unit. The peripheral part tracking function tracks, as a part other than the face, a part of the subject having a preset positional relationship with the face. The tracking switch function switches to the tracking of a part other than the face by the peripheral part tracking unit when the face cannot be tracked by the face tracking unit.

If the face is detected at a position estimated to be the face from the position of the peripheral part other than the face, or if the color information for the region corresponding to the face is detected, the tracking switch function returns to the tracking of the face by the face tracking function.

The face direction determination circuit 1311 determines the direction of the face detected by the face detection circuit 1305 in accordance with the locations of face parts 402, 404, and 406 in region 408 as shown in FIG. 2B. For example, when face parts 402, 404, and 406 are concentrated on one of the right and left sides of region 408, the face direction determination circuit 1311 determines that the face turned aside.

Various control parameters are stored in the ROM 134, such as control parameters necessary for the operations of the photographic optical system 102, the diaphragm 106, and the imaging element 114, and control parameters necessary for image processing in the image processing circuit 1304. For example, data for face parts used in the face detection in the face detection circuit 1305, and data for displaying a tracking frame are also stored in the ROM 134.

Figure 9:
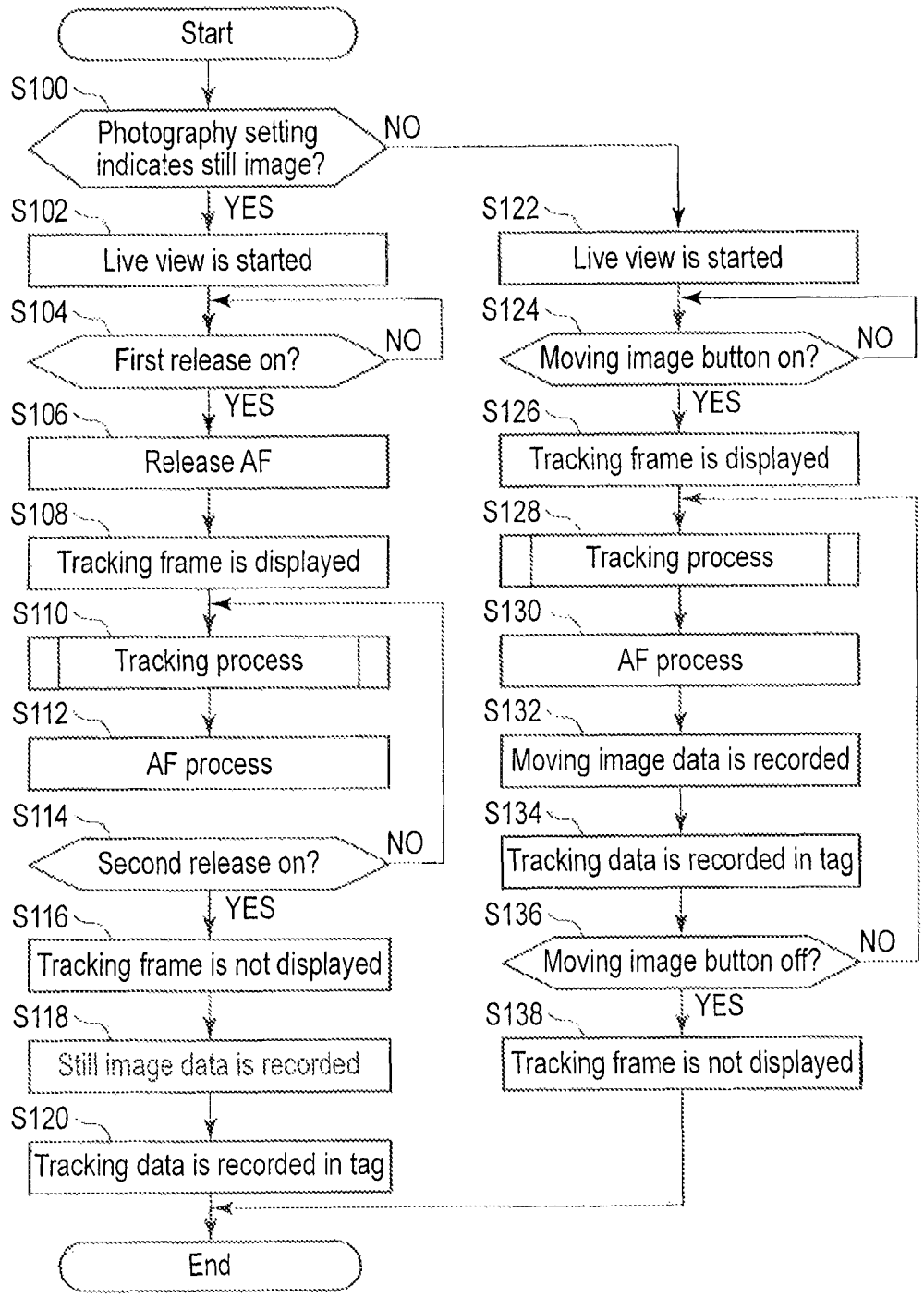
FIG. 9 is a flowchart of photography operation in the tracking apparatus.

Now, the operation of the present device having the above configuration is described with reference to a photography operation flowchart shown in FIG. 9.

The CPU 1301 reads a necessary program code from the ROM 134 to control the operation of the device 100.

In step S100, the CPU 1301 determines whether the current photography setting of the device 100 is the still image photography mode. The photography setting is set by the mode dial.

When the photography setting is determined to be the still image photography mode, the CPU 1301 starts a live view operation in step S102. In the live view operation, the CPU 1301 controls the shutter driving mechanism 112 to release the shutter 110, and then controls the imaging element interface circuit 116 to start the photography by the imaging element 114. The CPU 1301 then inputs, to the image processing circuit 1304, the image data which has been stored in the work area of the RAM 118 as a result of the photography by the imaging element 114, and the image data is subjected to image processing for live view display. The CPU 1301 then inputs, to the display element driving circuit 122, the image data which has been subjected to the image processing for the live view display, and an image is displayed on the display element 120. Moving images of the subject are displayed by repeating the above-described display operation. The user can observe the subject by the moving image display.

In step S104, the CPU 1301 determines whether the first release switch has been turned on. The CPU 1301 continues the live view operation until determining that the first release switch has been turned on.

When the first release switch is turned on, the CPU 1301 performs a release AF process in step S106. In the release AF, the focus lens is driven to an in-focus position by scan drive. In the scan drive, the CPU 1301 controls the focus adjustment mechanism 104 to drive the focus lens in one direction within a predetermined scan range, and at the same time, evaluates in-focus evaluation values sequentially calculated by the AF control circuit 1302. The CPU 1301 stops the driving of the focus lens at a lens position where contrast is maximized as a result of the evaluation of the in-focus evaluation values. Such scan drive is performed when there is a great difference between the position of the focus lens before AF and the in-focus position.

In step S108, the CPU 1301 controls the display element driving circuit 122 to display a tracking frame on the display element 120. The tracking frame is displayed at the position of the tracking target on the screen of the display element 120. For example, a subject brought into focus by the release AF may be set as a tracking target, and the tracking frame may be displayed on this subject. When the face of the person is detected by the face detection circuit 1305, the tracking frame D1 may be displayed on the face, for example, as shown in FIG. 6 or FIG. 7. When the subject displayed on the screen of the display element 120 is specified by the touchpanel 124, the tracking frame may be displayed on this subject. Thus, in the present embodiment, for example, the CPU 1301, the AF control circuit 1302, the face detection circuit 1305, and the touchpanel 124 function as examples of a tracking target setting unit.

In step S110, the CPU 1301 performs the tracking process for tracking the subject. This tracking process will be described later.

In step S112, the CPU 1301 performs an AF process to bring the subject at the tracking position into focus, and performs an AE process so that the subject at the tracking position will be properly exposed.

In the AF process after the tracking process, the focus lens is driven to the in-focus position by the scan drive or wobbling drive. In the wobbling drive, the CPU 1301 determines whether the in-focus evaluation value calculated by the AF control circuit 1302 when the focus lens is driven has increased as compared with the in-focus evaluation value at the previous lens position. When the in-focus evaluation value has increased, the CPU 1301 slightly drives the focus lens in the same direction as the previous direction. When the in-focus evaluation value has decreased, the CPU 1301 slightly drives the focus lens in a direction opposite to the previous direction. Such operation is rapidly repeated to gradually drive the focus lens to the in-focus position.

In the AE process, the CPU 1301 calculates an opening value (aperture value) of the diaphragm 106 and a release time (shutter speed value) of the shutter 110 during this exposure so that the luminance of the subject at the tracking position calculated by the AE control circuit 1303 will reach a predetermined proper amount (proper exposure amount).

In step S114, the CPU 1301 determines whether the second release switch has been turned on. When determining that the second release switch has not been turned on, the CPU 1301 performs processes after the tracking process in step S110. In the still image photography mode, the tracking process is continued until the second release switch is turned on.

When the second release switch is turned on, the CPU 1301 controls the display element driving circuit 122 so that the tracking frame D1 is not displayed, in step S116.

In step S118, the CPU 1301 performs a process to record still image data in the recording medium 128. At the same time, the CPU 1301 controls the shutter driving mechanism 112 to close the shutter 110. The CPU 1301 then controls the diaphragm driving mechanism 108 to narrow the diaphragm 106 to the previously calculated aperture value. The CPU 1301 then controls the shutter driving mechanism 112 to release the shutter 110 for the previously calculated release time, and at the same time, performs the photography (exposure) by the imaging element 114. The CPU 1301 then processes, in the image processing circuit 1304, the still image data obtained via the imaging element 114. The CPU 1301 then provides a header to the still image data processed in the image processing circuit 1304 to generate a still image file, and records the generated still image file in the recording medium 128.

In step S120, the CPU 1301 additionally writes data that indicates the tracking position obtained as a result of the tracking process in step S110 in the still image file previously recorded in the recording medium 128. The CPU 1301 then ends the operation that follows the photography operation flowchart shown in FIG. 9.

On the other hand, when the photography setting is determined to be the moving image photography mode in step S100, the CPU 1301 starts the live view operation in step S122.

If it is determined that the moving image button has been turned on to turn on the moving image photography, the CPU 1301, in step S126, controls the display element driving circuit 122 so that the display element 120 displays the tracking frame D1 on the face, for example, as shown in FIG. 6 or FIG. 7.

In step S128, the CPU 1301 instructs the face detection circuit 1305, the face tracking circuit 1307, and the peripheral part tracking circuit 1308 to start the tracking process. The tracking process will be described later.

In step S130, the CPU 1301 instructs the AF control circuit 1302 to perform the AF process to focus on the subject at the tracking position, and also instructs the AE control circuit 1303 to perform the AE process so that the exposure of the subject at the tracking position will be proper. In the AF process, the focus lens of the photographic optical system 102 is driven to the in-focus position by the wobbling drive.

In step S132, the CPU 1301 performs a process to record still image data in the recording medium 128. At the same time, the CPU 1301 controls the diaphragm driving mechanism 108 to narrow the diaphragm 106 to the aperture value calculated in the AE process. The CPU 1301 then causes the imaging element 114 to perform imaging (exposure) for a time corresponding to the shutter speed value calculated in the AE process. After the end of the exposure, the CPU 1301 generates a moving image file and records the moving image file the recording medium 128. The CPU 1301 processes, in the image processing circuit 1304, the moving image data obtained via the imaging element 114, and records, in the moving image file, the moving image data processed in the image processing circuit 1304.

In step S134, the CPU 1301 records data that indicates the tracking position obtained as a result of the tracking process in step S128 in the moving image file previously recorded in the recording medium 128.

In step S136, the CPU 1301 determines whether the moving image button has been turned off. When determining that the moving image button has not been turned off, the CPU 1301 performs processes after the tracking process in step S128. In the moving image photography mode, the tracking process and the recording of the moving image data are continued until the moving image button is turned off.

When determining that the moving image button has been turned off, the CPU 1301, in step S138, controls the display element driving circuit 122 so that the tracking frame D1 is not displayed. The CPU 1301 then ends the operation that follows the photography operation flowchart shown in FIG. 9.

Now, the tracking process according to the present embodiment is described with reference to a tracking process flowchart shown in FIG. 10.

In step S200, the CPU 1301 controls the imaging element interface circuit 116 to perform the imaging by the imaging element 114.

In step S201, the CPU 1301 loads, into the RAM 118, image data obtained in the imaging element interface circuit 116 as a result of the imaging by the imaging element 114. The CPU 1301 regards image data obtained in the initial tracking process as evaluation image data, and loads the image data into the evaluation image area of the RAM 118. The CPU 1301 regards image data obtained in and after the second tracking process as reference image data, and loads the image data obtained in and after the second tracking process into the reference image area of the RAM 118.

In step S202, the CPU 1301 causes the face detection circuit 1305 to detect the face of the subject from the image data containing a subject such as a person. As has been described with reference to FIG. 2A and FIG. 2B, the face detection circuit 1305 finds the amount of correlation between the image data obtained by each frame and each of face parts 402, 404, and 406. The face detection circuit 1305 detects a region including the face of the person by using the fact that the correlation amount is maximized by a predetermined arrangement that shows the face of the person.

In step S203, the CPU 1301 causes the peripheral part tracking circuit 1308 to set, as a peripheral part, a peripheral part other than the face of the subject, for example, the breast which has been detected by the face detection circuit 1305 and which is located a preset distance below the face.

In step S204, the CPU 1301 causes the face tracking circuit 1307 to track the face by using the luminance information for the image data, and causes the peripheral part tracking circuit 1308 to track the breast by using the luminance information for the image data. In the tracking process that uses the luminance information, when the subject which is a tracking target in the N−1 frame is set for the face and breast as has been described above with reference to FIG. 3A and FIG. 3B, the image data, for this N−1 frame is stored in the evaluation image area of the RAM 118 as evaluation image data. The image data in the predetermined range 202 of the evaluation image data including the tracking target is set as standard image data. Subsequently, in the tracking process, a part corresponding to the standard image data 202 is searched for in the reference image data for the N frame shown in FIG. 3B.

In the initial tracking process, the evaluation image data is only acquired, so that processing in and after step S204 is omitted. The explanation that follows is based on the assumption that both the evaluation image data and the reference image data have been acquired.

In step S205, the CPU 1301 stores, in a tracking log area of the RAM 118, tracking positions obtained as a result of the tracking processes for the face and the breast using the luminance information.

In step S206, the CPU 1301 causes the face tracking circuit 1307 to track the face by using the color information for the image data, and causes the peripheral part tracking circuit 1308 to track the breast by using the color information for the image data. In the tracking process that uses the color information, a region that can be determined to have the same color as the color set in the evaluation image data is searched for as a tracking color region for face and the breast. When the given position 302 of the subject is specified in the N−1 frame as shown in FIG. 4A, face tracking circuit 1307 acquires the color information for the position 302 in the evaluation image data, and uses this position 302 as a start position of the tracking process to search for a region having the same color information as the position 302.

In step S207, the CPU 1301 stores, in the tracking log area of the RAM 118, tracking positions of the face and the breast obtained as a result of the tracking processes that use the color information. The CPU 1301 stores, in the tracking color region log area of the RAM 118, the tracking color region obtained as a result of the tracking process that uses the color information.

In step S208, the CPU 1301 causes the tracking switch circuit 1309 to determine whether the face can be tracked. More specifically, the tracking switch circuit 1309 determines whether the performance of the tracking has deteriorated because the face is not detected in the image data and the face cannot be tracked in accordance with the region having the color information for the flesh color.

When the face is detected in the image data or when the face can be tracked in accordance with the region having the color information for the flesh color, it is determined that the tracking of the face is possible. Whether the tracking can be performed in accordance with the region having the color information for the flesh color determined by whether the flesh color information stored as the tracking target is included in the image data.

When the face is not detected in the image data and the face cannot be tracked in accordance with the region having the color information for the flesh color, it is determined that the tracking of the face is impossible.

When it is determined that face data is included in the image data and the face can be tracked in accordance with the region having the color information for the flesh color, the CPU 1301 performs the priority tracking position determination process in step S209. The priority tracking position determination process is a process for determining whether to adopt, in the tracking of the face, the result of the tracking process that uses the luminance information or the result of the tracking process that uses the color information. Here, the face can be tracked by using the luminance information and the color information as described above, so that the priority tracking position determination process gives priority to, for example, the result of the tracking process that uses the color information.

In step S210, the CPU 1301 determines the reliability of the tracking position adopted as the result of the priority tracking position determination process. When the result of the tracking process that uses the luminance information is adopted, the CPU 1301 determines the reliability, for example, by the contrast of the reference image data.

More specifically, when the sum of the differences between adjacent pixels in the tracking target region in the reference image data is less than or equal to a predetermined value, the tracking position is determined to be reliable. When the result of the tracking process that uses the color information is adopted, the reliability is determined, for example, by the chroma of the reference image data. More specifically, when the chroma of the tracking position of the reference image data is greater than or equal to a predetermined value, the tracking position is determined to be reliable. The thresholds for determining the reliability can be properly set by simulation results or experimental data.

In step S211, the CPU 1301 records the final tracking position of the reference image data in the tracking log area of the RAM 118 in the next tracking process, this final tracking position is used as a start position of the tracking process in both the tracking process that uses the luminance information and the tracking process that uses the color information. However, when the tracking position is determined to be unreliable in step S216, the tracking position may not be recorded.

In step S212, the CPU 1301 controls the display element driving circuit 122 to update the display position of the face tracking frame D1 to a position corresponding to the tracking position stored in step S218, for example, as shown in FIG. 6 or FIG. 7.

On the other hand, if it is determined in step S208 that the performance of the tracking has deteriorated because no face data is included in the image data and the face cannot be tracked in accordance with the region having the color information for the flesh color, the CPU 1301 determines that the face cannot be tracked.

Moving to step S213, the CPU 1301 causes the tracking switch circuit 1309 to switch to the tracking of a peripheral part by the peripheral part tracking circuit 1308 from the tracking of the face. The peripheral part is a position estimated by the CPU 1301 from a face detection result and previously acquired statistical data.

More specifically, the position of the face is used as a standard, and a position located below the standard position by a distance which has been obtained by the statistical data is set as the position of the face peripheral part. Here, the statistical data stored in the ROM 134 is statistical data regarding the range from the position of the face measured at a fixed distance to the position of the face peripheral part.

Therefore, when the distance from the imaging device to the tracking target is different from the distance at the time of the acquisition of the statistical data, the position of the face peripheral part is corrected in accordance with the distance difference. The distance from the imaging device to the tracking target is calculated, for example, from the size of the face (the proportion of the sire of the face on the screen). The value of the statistical data is corrected by this distance to calculate the position of the face peripheral part on actual image data. The peripheral part tracking circuit 1308 uses the luminance information and color information for the image data to track the peripheral part.

In step S214, the CPU 1301 performs the priority tracking position determination process. The priority tracking position determination process is a process for determining whether to adopt, in the tracking of the peripheral part, the result of the tracking process that uses the luminance information or the result of the tracking process that uses the color information. More specifically, a priority tracking position is determined from the positional relationship of the tracking positions calculated from the luminance information and the color information, and from the color information at the tracking position calculated from the luminance information and the color information.

In step S215, the CPU 1301 determines the reliability of the tracking position adopted as the result of the priority tracking position determination process. When the result of the tracking process that uses the luminance information is adopted, the CPU 1301 determines the reliability, for example, by the contrast of tee reference image data. More specifically, when the sum of the differences between adjacent pixels in the tracking target region in the reference image data is less than or equal to a predetermined value, the CPU 1301 determines that the tracking position is reliable.

In step S211, the CPU 1301 records the final tracking position of the reference image data in the tracking log area of the RAM 118. In the next tracking process, this final tracking position is used as a start position of the tracking process in the tracking process that uses the luminance information. However, when the tracking position is determined to be unreliable in step S216, the tracking position may not be recorded.

In step S212, the CPU 1301 controls the display element driving circuit 122 to update the display position of the breast tracking frame D2 to a position corresponding to the tracking position stored in step S211, for example, as shown in FIG. 6 or FIG. 8.

The CPU 1301 performs steps S201 to S207, and in step S208, causes the tracking switch circuit 1309 to determine whether the face can be tracked. That is, the CPU 1301 determines whether the face is detected or the color information for the flesh color corresponding to the face is detected at a position estimated to be the face from the position of a part other than the face such as the breast.

If the CPU 1301 determines that the face is not detected or the color information for the flesh color corresponding to the face is not detected at the position estimated to be the face from the position of, for example, the breast, the CPU 1301 moves to step S213, and causes the tracking switch circuit 1309 to continue the tracking of the breast. The peripheral part tracking circuit 1308 uses the luminance information and color information for the image data to track the breast as described above.

On the other hand, if the CPU 1301 determines that the face is detected or the color information for the flesh color corresponding to the face is detected at the position estimated to be the face from the position of the breast, the CPU 1301 returns to the tracking of the face by the face tracking circuit 1307 from the tracking of the breast by the peripheral part tracking circuit 1308. The tracking switch circuit 1309 previously stores the color information for the flesh color corresponding to the face, and considers that the color information for the flesh color corresponding to the face has been detected when the color information at the position estimated to be the face corresponds to the previously stored color information.

The CPU 1301 performs steps S209 to S211 and in step S212, returns to the tracking of the face by the face tracking circuit 1307 shown in FIG. 6 or FIG. 7 (the display of the face tracking frame D1) from the tracking of the breast by the peripheral part tracking circuit 1308 shown in FIG. 8 (the display of the breast tracking frame D2).

Figure 10:
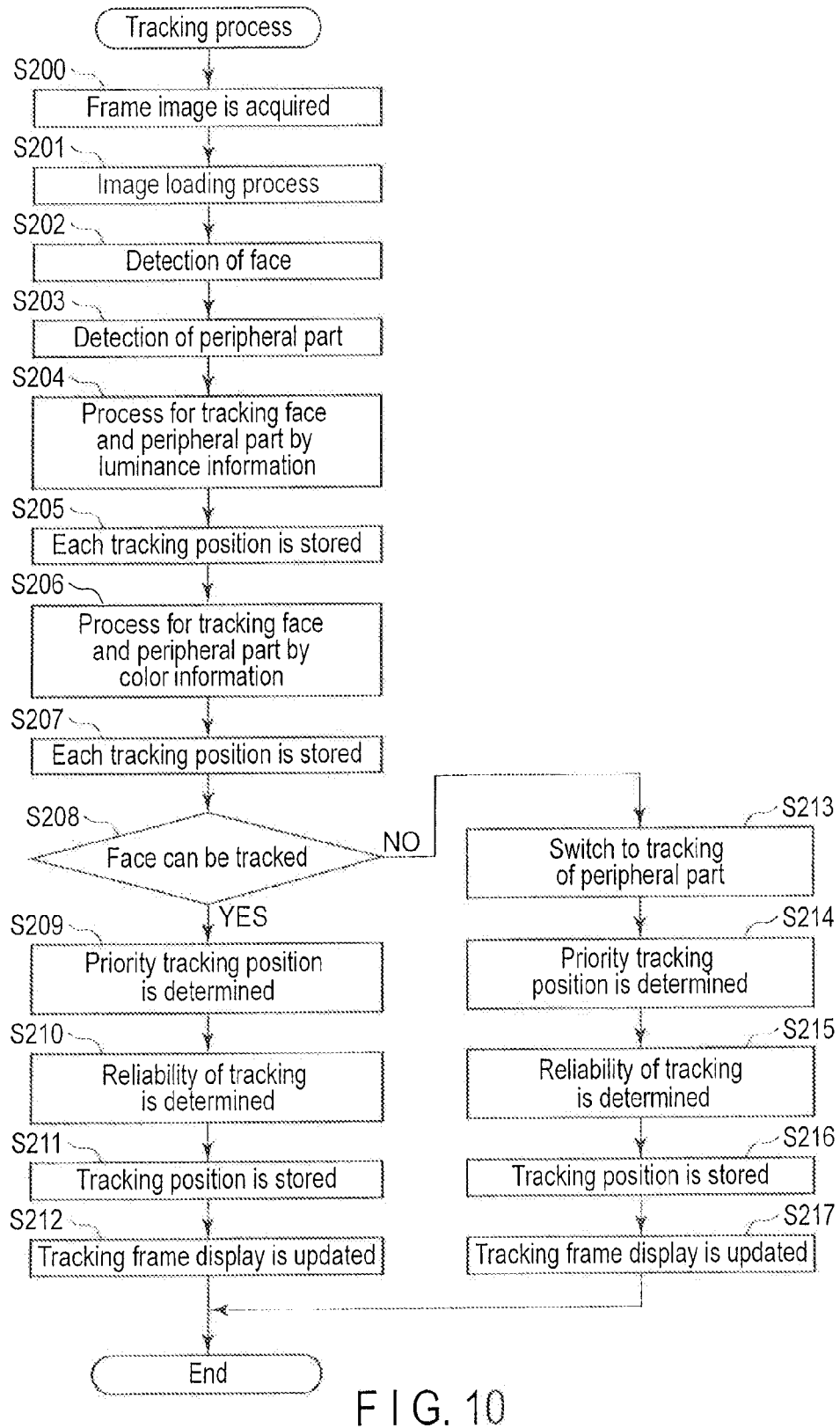
FIG. 10 is a flowchart of a tracking process in the tracking apparatus.

The CPU 1301 then ends the tracking process that follows the tracking process flowchart shown in FIG. 10.

Thus, when the tracking of the face of the subject cannot be continued, the tracking process described above switches to the tracking of a peripheral part other than the face, for example, the breast to track the subject. Consequently, for example, when the face and at least two regions of the breast are used to track the subject, the standard region is switched to, for example, the breast, and the region of the breast is used to ensure that the subject can be tracked even if the result of the tracking that uses the face as the standard region is not acceptable.

The tracking that uses the face can be again performed if the subject is being tracked by using the region of the breast as the standard region and the face is detected or the color information corresponding to the face is detected at the position estimated to be the face from the position of the breast.

The switch to the tracking of the breast from the tracking of the face is based on the condition that the performance of the tracking has deteriorated because no face data is included in the image data and the face cannot be tracked in accordance with the region having the color information for the flesh color. Therefore, the switch to the tracking of the breast is permitted at the point where the tracking of the face is completely impossible.

The return to the tracking of the face from the tracking of the breast is based on the condition that the face is detected or the color information for the flesh color corresponding to the face is detected at the position estimated to be the face from the position of the breast. Therefore, the return to the tracking of the face is permitted at the point where the tracking of the face is completely possible.

The face and the breast are set to the relationship in which the breast is located a preset distance below the face of the subject on the image data, and are also set so that the face is located a preset distance above the breast. This ensures that, for example, even if the face cannot be tracked any longer, the tracking can be switched to the tracking of the breast of the same person without being switched to the tracking of the breast of a different person. Similarly, in the case of the return to the tracking of the face from the tracking of the breast, the tracking can be switched to the tracking of the face of the same person without being switched to the tracking of the face of a different person. As a result, the tracking of the same person can be always continued even if the part to be tracked is switched.

Although the tracking is switched between the tracking of the face and the tracking of the breast in the embodiment described above, this is not a limitation. The tracking of the face may be the main tracking, and for example, the tracking of the neck, the tracking of the abdomen, the tracking of the leg, or the tracking of the arm may be added as the tracking of the peripheral parts.

Figure 11:
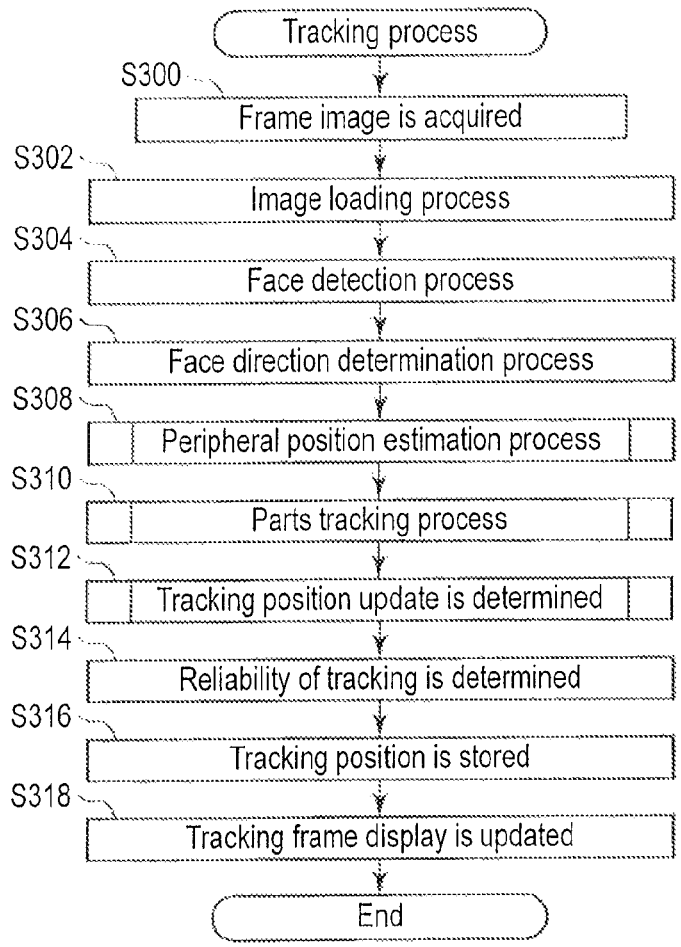
FIG. 11 is a flowchart of the tracking process in the tracking apparatus.

Now, another tracking process according to the present device having the above configuration is described with reference to a tracking process flowchart shown in FIG. 11.

In this tracking, a tracking target is tracked by using a plurality of tracking processes.

In step S300, the CPU 1301 controls the imaging element interface circuit 116 to perform the imaging by the imaging element 114. In step S302, the CPU 1301 loads, into the RAM 118, image data obtained in the imaging element interface circuit 116 as a result of the imaging by the imaging element 114, image data obtained in the initial tracking process is used as evaluation image data, so that the CPU 1301 loads the image data obtained in the initial tracking process into the evaluation image area of the RAM 118. Therefore, image data obtained in and after the second tracking process are used as reference image data. The CPU 1301 loads the image data obtained in and after the second tracking process into the reference image area of the RAM 118.

In step S304, the face tracking circuit 1307 performs the tracking process that uses the face detection in the same manner as described above. In a face detection process, the face is detected from the evaluation image data in the initial tracking process. In and after the second tracking process, the face is detected from the reference image data.

In step S306, the face direction determination circuit 1311 determines the direction of the face detected in step S304. When the face is not detected in step S304, the processing in step S306 and the processing in step S308 that follows are omitted.

In step S308, the CPU 1301 estimates the position of the face peripheral part from the position of the face detected by the face detection circuit 1305. The face peripheral part is a part (for example, the trunk, or the hand or leg) other than the face the subject which is a tracking target. In the following explanation, the position of the breast of the tracking target is estimated as an example of the face peripheral part.

In step S310, the face tracking circuit 1307 tracks the face and face peripheral part of the tracking target. In step S312, the CPU 1301 performs a tracking position update determination process. This tracking position update determination process is a process for determining which of a plurality of candidate tracking positions obtained by the tracking processes to adopt as the tracking position in the next frame.

In step S314, the CPU 1301 determines the reliability of the tracking position adopted as the result of the tracking position update determination process. When the result of the tracking process that uses the face detection is adopted, the CPU 1301 determines the reliability by the results of the face detection in a plurality of past frames. More specifically, when the face is detected in a plurality of past frames, the CPU 1301 determines that the tracking position is reliable.

When the result of the tracking process that uses the luminance information is adopted, the reliability is determined, for example, by the contrast of the reference image data. More specifically, when the sum of the differences between adjacent pixels in the tracking target region in the reference image data is less than or equal to a predetermined value, it is determined that the tracking peal on is reliable.

When the result of the tracking process that uses the color information is adopted, the reliability is determined, for example, by the chroma of the reference image data. More specifically, when the chroma of the tracking position of the reference image data is less than or equal to a predetermined value, the tracking position is determined to be reliable. The thresholds for determining the reliability can be properly set.

In step S316, the CPU 1301 records the final tracking position in the tracking log area of the RAM 118. In the present embodiment, both the tracking process of the face and the tracking process of the face peripheral part are performed, so that both the tracking position of the face and the tracking position of the face peripheral part are obtained. One of the tracking positions is used for the AF control and the AE control. For example, when the detection result at the tracking position of the face is effective as a result of the determination of the reliability in step S314, that is, when the reliability of the face detection in the face detection circuit 1305 or the reliability of the tracking of the face in a parts tracking process is effective, the CPU 1301 adopts the tracking position of the face.

When the detection result at the tracking position of the face is ineffective as a result of the determination of the reliability in step S314, that is, when both the reliability of the face detection in the face detection circuit 1305 and the reliability of the tracking of the face in the parts tracking process are not effective, the CPU 1301 adopts the tracking position of the face peripheral part. However, the tracking positions of both the face and the face peripheral part are stored in the RAM 118. When both the tracking positions are determined to be unreliable, the tracking positions may be recorded.

In step S318, the CPU 1301 controls the display element driving circuit 122 to update the display position of the tracking frame to a position corresponding to the tracking position stored in step S316. The CPU 1301 then ends the tracking process shown in FIG. 11.

Now, a peripheral position estimation process is described with reference to a peripheral position estimation process flowchart shown in FIG. 12.

In the peripheral position estimation process, the position of the face peripheral part (breast) of a tracking target is estimated from the position of the face detected in the face detection process.

In step S400, the CPU 1301 acquires information regarding the position of the face (for example, position of the center of gravity of the face region) detected by the face detection circuit 1305.

In step S402, the CPU 1301 acquires information regarding the size of the face (for example, the size of the face region) detected by the face detection circuit 1305.

In step S404, the CPU 1301 acquires, from the ROM 134, statistical data indicating the distance from the position of the face to the position of the face peripheral part (breast).

In step S406, the CPU 1301 calculates the position of the face peripheral part on the image data from the acquired statistical data. More specifically, the CPU 1301 uses the position of the face as a standard, and sets, as the position of the face peripheral part, a position located below the standard position by a distance which has been obtained by the statistical data. The statistical data stored in the ROM 134 is statistical data regarding the range from the position of the face measured at a fixed distance to the position of the face peripheral part.

Therefore, when the distance from the imaging device to the tracking target is different from the distance at the time of the acquisition of the statistical data, the CPU 1301 corrects the position of the face peripheral part in accordance with the distance difference. The CPU 1301 calculates the distance from the imaging device to the tracking target, for example, from the size of the face (the proportion of the size of the face on the screen). The CPU 1301 corrects the value of the statistical data by the calculated distance to calculate the position of the face peripheral part on actual image data. After the calculation of the position of the face peripheral part, the CPU 1301 ends the peripheral position estimation process shown in FIG. 12.

In the example of the peripheral position estimation process shown in FIG. 12, the position below the position of the face is the position of the face peripheral part for the simplification of explanation. In this case, a correct result is obtained when a person as the tracking target is standing erect. However, for example, when the person as the tracking target is lying, a correct result cannot be obtained.

Accordingly, each part (for example, the eye, the nose, or the mouth) of the face may be detected, and the direction of each part relative to the screen may be determined. Thereby, whether the person as the tracking target is standing erect or lying may be determined, and the position of the face peripheral part may be calculated in accordance with the determination. For example, when the eye, the nose, and the mouth arranged in order from the left side of the screen to the right, the face peripheral part is estimated to be located at the rightward position relative to the position of the face.

Figure 12:
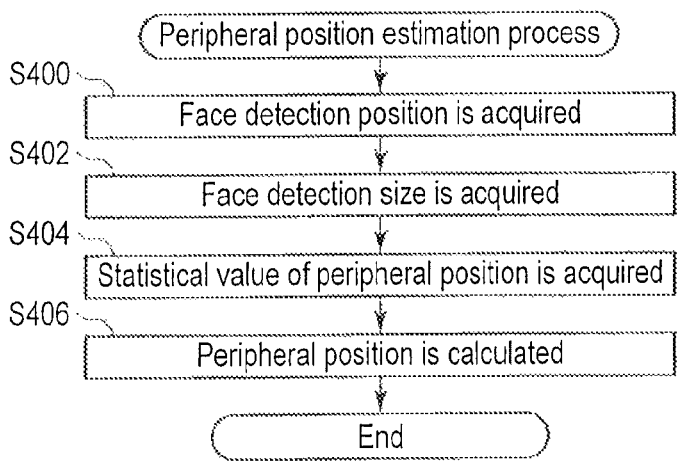
FIG. 12 is a flowchart of a peripheral position estimation process in the tracking apparatus.

In the example of the peripheral position estimation process shown in FIG. 12, the position of the face peripheral part is estimated from the position of the face detected by the face detection circuit 1305. In contrast, the position of the face peripheral part may be estimated from the tracking position of the face obtained in the later-described parts tracking process.

Now, the parts tracking process is described with reference to a parts tracking process flowchart shown in FIG. 13.

In the parts tracking process, the face and the face peripheral part of the tracking target are tracked in the tracking processes other than the face detection process.

In step S500, the face tracking circuit 1307 performs the tracking process of the face that uses the color information as first characteristic information. More specifically, the face tracking circuit 1307 tracks, in the reference image data, the tracking color region having the same color information as the color information for the face set in the evaluation image data. The CPU 1301 stores, in the tracking log area of the RAM 118, a tracking position of the face obtained as a result of the tracking processes that use the color information. The CPU 1301 stores, in the tracking color region log area of the RAM 118, the tracking color region of the face obtained as a result of the tracking process that uses the color information.

In the initial parts tracking process, the evaluation image data is only acquired, so that processing in and after step S500 is omitted. The explanation that follows is based on the assumption that both the evaluation image data and the reference image data have been acquired.

In step S502, the face tracking circuit 1307 performs the tracking process of the face that uses the luminance information as second characteristic information. More specifically, the face tracking circuit 1307 tracks, in the reference image data, the region having the same pattern as the face set in the evaluation image data. The CPU 1301 stores, in the tracking log area of the RAM 118, a tracking position of the face obtained as a result of the tracking processes that use the luminance information.

In step S504, the CPU 1301 sets one of the tracking result by the face tracking circuit 1307 and the tracking result by the face tracking circuit 1307 as the final tracking position of the face (face candidate tracking position) in the parts tracking process.

In step S506, the face tracking circuit 1307 performs the tracking process of the face peripheral part that uses the color information. More specifically the face tracking circuit 1307 tracks, in the reference image data, the tracking color region having the same color information as the color information (for example, clothes color information) for the face peripheral part (for example, the breast) set in the evaluation image data. The CPU 1301 stores, in the tracking area of the RAM 118, a tracking position of the face peripheral part obtained as a result of the tracking processes that use the color information. The CPU 1301 stores, in the tracking color region log area of the RAM 118, the tracking color region of the face peripheral part obtained as a result of the tracking process that uses the color information.

In step S508, the face tracking circuit 1307 performs the tracking process of the face peripheral part that uses the luminance information. More specifically, the face tracking circuit 1307 tracks, in the reference image data, the region having the same pattern as the face peripheral part set in the evaluation image data. The CPU 1301 stores, in the tracking log area of the RAM 118, a tracking position of the face peripheral part obtained as a result of the tracking process that uses the luminance information.

In step S510, the CPU 1301 sets one of the tracking result by the face tracking circuit 1307 and the tracking result by the face tracking circuit 1307 as the final tracking position of the face peripheral part (peripheral part candidate tracking position) in the parts tracking process. After a peripheral part candidate tracking position calculating process, the CPU 1301 ends the parts tracking process shown in FIG. 13.

Now, a face candidate tracking position calculating process and the peripheral part candidate tracking position calculating process are described with reference to a flowchart for the face candidate tracking position calculating process and the peripheral part candidate tracking position calculating process shown in FIG. 14.

The face candidate tracking position calculating process and the peripheral part candidate tracking position calculating process are only different in that the tracking position used in each process is the tracking position of the face or the face peripheral part. Therefore, these processes are described together with reference to FIG. 14.

In the process shown in FIG. 14, the final candidate tracking position is decided in accordance with the comparison between the color information at the tracking position obtained by the color information and the color information at the tracking position obtained by the luminance information and in accordance with the positional relationship between the tracking position obtained by the color information and the tracking position obtained by the luminance information.

In step S600, the color information detection circuit 1306 acquires the color information at the tracking position obtained by the luminance information in the reference image data. Actually, the color information in a small region that includes this tracking position is acquired.

In step S602, the CPU 1301 determines whether the color information at the tracking position obtained by the color information (the color information in the tracking color region) corresponds to the color information at the tracking position obtained by the luminance information. The correspondence means that the color information at the tracking position obtained by the luminance information is within a given range preset on the basis of the color information at the tracking position obtained by the color information.

When the color information at the tracking position obtained by the color information corresponds to the color information at the tracking position obtained by the luminance information, the CPU 1301 determines in step S604 whether the tracking color region includes the tracking position obtained by the luminance information.

When determining that the tracking color region does not include the tracking position obtained by the luminance information, the CPU 1301 adopts, in step S606, the tracking position obtained by the luminance information as the final candidate tracking position. The CPU 1301 then ends the face candidate tracking position calculating process and the peripheral part candidate tracking position calculating process shown in FIG. 14.

When the color information at the tracking position obtained by the color information does not correspond to the color information at the tracking position obtained by the luminance information in step S602, or when it is determined in step S604 that the tracking color region includes the tracking position obtained by the luminance information, the CPU 1301 adopts, in step S608, the tracking position obtained by the color information as the final candidate tracking position. The CPU 1301 then ends the face candidate tracking position calculating process and the peripheral part candidate tracking position calculating process shown in FIG. 14.

The final candidate tracking position is decided as shown in FIG. 14, so that a rapidly moving tracking target can be tracked by the tracking process that uses the color information. In a scene that includes a plurality of subjects having the same color, the subject can be tracked by the tracking process that uses the luminance information. This allows the tracking target to be kept tracked even if the face detection is unsuccessful.

Figure 13:
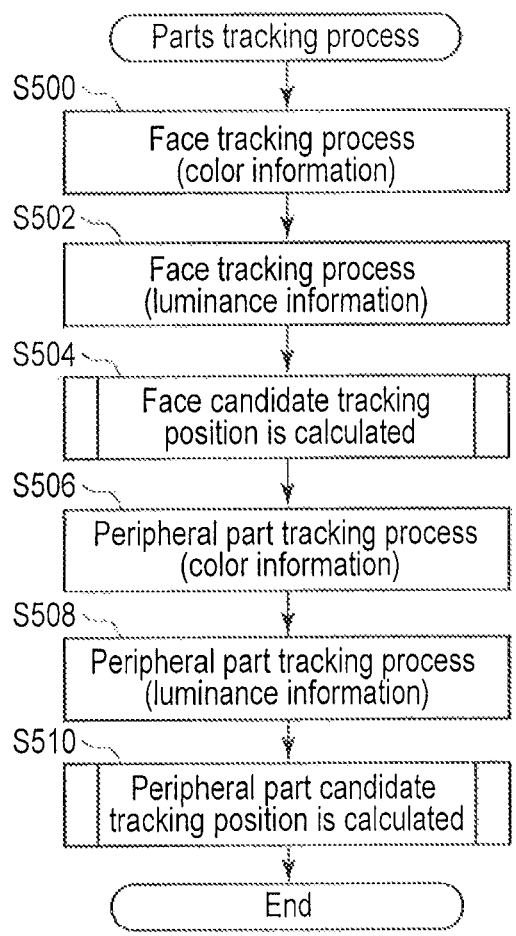
FIG. 13 is a flowchart of a parts tracking process in the tracking apparatus.

Although the tracking process is performed by the combination of the luminance information and the color information in the parts tracking process shown in FIG. 13, other tracking processes such as a tracking process based on characteristic amount detection may be used together.

Now, the tracking position update determination process is described with reference to a parts tracking process tracking position update determination process flowchart shown in FIG. 15.

In the tracking position update determination process, the final tracking position is determined by the direction of the face which is a tracking target.

In step S700, the face detection circuit 1305 determines whether the face is detected. When it is determined that the face is detected, the face direction determination circuit 1311 determines the direction of the face in step S702. As a result of the determination of the direction of the face, the face direction determination circuit 1311 determines whether, for example, the face is directed forward.

When it is determined that the face is directed forward, the CPU 1301 sets, in step S704, the position of the face (for example, the position of the center of gravity of region 408 shown in FIG. 25) detected by the face detection circuit 1305 as the final tracking position of the face.

In the next frame, the CPU 1301 uses the final tracking position of the face as the start position of the tracking process, and then performs the face detection process, the tracking process of the face using the color information, and the tracking process of the face using the luminance information. In step S706, the CPU 1301 sets, as the final tracking position of the face peripheral part, the position of the face peripheral part calculated by the peripheral position estimation process.

In the next frame, the CPU 1301 uses the final tracking position of the face peripheral part as the start position of the tracking process, and then performs the tracking process of the face peripheral part that uses the color information and the tracking process of the face peripheral part that uses the luminance information. In step S708, the color information detection circuit 1306 acquires the color information at the position of the face peripheral part calculated in the peripheral position estimation process.

The CPU 1301 updates the color information to be tracked in the tracking process of the face peripheral part that uses the color information in the next frame to the new acquired color information at the position of the face peripheral part.

The CPU 1301 then ends the tracking position update determination process shown in FIG. 15.

An example of a scene corresponding to step S704 to step S708 is shown in FIG. 16A and FIG. 16B. When the face is detected, a region A1 that includes the face as shown in FIG. 16A is obtained. The position of the center of gravity of region A1 is the position of the face. A position E1 located a predetermined distance below the face is the position of the face peripheral part. In contrast, the parts tracking process is performed separately from the face detection process. For example, in FIG. 16B, a position F1 is a candidate tracking position of the face, and a position G1 is a candidate tracking position of the face peripheral part.

When the face is directed forward as shown in FIG. 16B, both the face detection accuracy and the face peripheral part estimation accuracy are considered to be high. Therefore, in the present embodiment, when the tracking result shown in FIG. 16B is obtained, the start position of the tracking process of the face the face tracking circuit 1307 in the next frame is position A1 of the face detected by the face detection circuit 1305 instead of position F1. This makes it easier to track the same face in the next frame as well. Similarly, the start position of the tracking process of the face peripheral part in the CPU 1301 (face tracking circuits 1307 and color information detection circuit 1306) in the next frame is position E1 of the face peripheral part estimated in the peripheral position estimation process instead of position G1. This makes it easier to track the same face peripheral part in the next frame as well.

A person is mostly wearing clothes, and the clothes often have various designs. Thus, particularly in the tracking process that uses the color information, it is preferable to perform the tracking process in accordance with the color information at the position of the closest face peripheral part. Therefore, the CPU 1301 updates the color information for the tracking target to the color information at position E1 in step S708.

If it is determined in step S702 that the face is not directed forward, the CPU 1301 sets, as the final tracking position of the face, the position of the face detected by the face detection circuit 1305 in step S710.

In step S712, the CPU 1301 sets, as the final tracking position of the face peripheral part, the candidate tracking position of the face peripheral part obtained in the parts tracking process.

In step S714, the CPU 1301 uses the past color information as it is without updating the color information to be tracked in the tracking process that uses the color information.

The CPU 1301 then ends the tracking position update determination process shown in FIG. 15.

An example of a scene corresponding to step S710 to step S714 is shown in FIG. 16C. When the face is detected, a region A2 that includes the face as shown in FIG. 16C is obtained. The position of the center of gravity of region A2 is the position of the face. A position E2 located a predetermined distance below the face is the position of the face peripheral part.

In contrast, the parts tracking process is performed separately from the face detection process. For example, as shown in FIG. 16C, a position C1 is a candidate tracking position of the face, and a position G1 is a candidate tracking position of the face peripheral part.

When the face can be detected and the face is not directed forward as shown in FIG. 16C, in other words, when the face is turned aside, the face detection accuracy is ensured to a certain degree, but the estimation accuracy is not ensured for the face peripheral part detection accuracy. This is attributed to the fact that the face peripheral part is simply estimated as a position located a predetermined distance from the face. In the present embodiment, when the tracking result shown in FIG. 16C is obtained, the start position of the tracking process of the face by the face tracking circuit 1307 in the next frame is a position A2 of the face detected by the face detection circuit 1305 instead of position F1.

On the other hand, the start position of the tracking process of the face peripheral part by the face tracking circuit 1307 in the next frame is a position G1 of the face peripheral part obtained in the current parts tracking process. This permits the face peripheral part to be accurately tracked in the next frame as well. When the face is turned aside, the face peripheral part estimation accuracy is not ensured, so that the color information for the tracking target is not updated.

When it is determined in step S700 that the face is not detected by the face detection circuit 1305, the CPU 1301 sets, in step S716, the candidate tracking position of the face peripheral part obtained in the parts tracking process as the final tracking position of the face.

In step S718, the CPU 1301 sets, as the final tracking position of the face peripheral part, the candidate tracking position of the face peripheral part obtained in the parts tracking process.

In step S720, the CPU 1301 uses the past color information as it is without updating the color information to be tracked in the tracking process that uses the color information. The CPU 1301 then ends the tracking position update determination process shown in FIG. 15.

An example of a scene corresponding to step S716 to step S720 is shown in FIG. 16D. As the face is not detected, the result of the tracking process is only obtained by the parts tracking process. For example, as shown in FIG. 16D, a position F2 is a candidate tracking position of the face, and a position G2 is candidate tracking position of the face peripheral part.

When the face cannot be detected because the face is turned back or the face has greatly moved as shown in FIG. 16D, the start position of the tracking process of the face by the face tracking circuit 1307 in the next frame is position F2 of the face obtained in the current parts tracking process. The start position of the tracking process of the face peripheral part by the face tracking circuit 1307 in the next frame is position G2 of the face peripheral part obtained in the current parts tracking process. This permits the face and the face peripheral part to be accurately tracked in the next frame as well. The color information for the tracking target is not updated even when the face cannot be detected.

Now, the display of the tracking frame is described. As has been described in step S216, both the tracking process of the face and the tracking process of the face peripheral part are performed in the present embodiment, so that both the tracking positions of the face and the face peripheral part are also obtained. In the present embodiment, one of the tracking positions of the face and the face peripheral part is used as the tracking position for use in the AF control and the AE control.

Figure 17A:
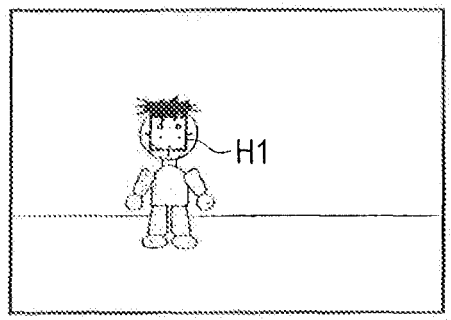
FIG. 17A is a diagram showing an example of the display of a display frame at the position of the face in the tracking apparatus.
Figure 17B:
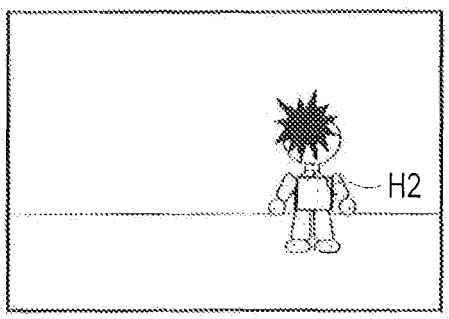
FIG. 17B is a diagram showing an example of the display of a display frame in a face peripheral part in the tracking apparatus.

Regarding the display of the tracking frame, the finally adopted tracking frame is displayed. For example, when the tracking position of the face is adopted, a tracking frame H1 is displayed at the position of the face which is a tracking target as shown in FIG. 17A. When the tracking position of the face peripheral part is adopted, a tracking frame 62 is displayed at the position of the face peripheral part which is a tracking target as shown in FIG. 17B. The tracking frames are displayed as shown in FIG. 17A and FIG. 17B, so that the user can easily visually recognize the current part targeted for the AF control and the AE control.

Figure 17C:
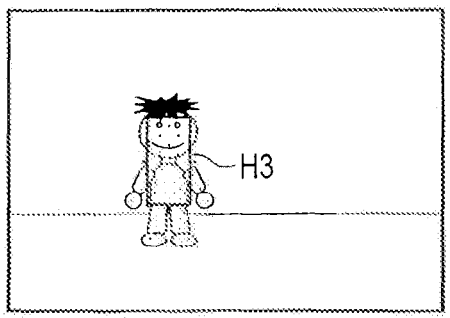
FIG. 17C is a diagram showing an example of the display of a display frame including the face and the face periphery in the tracking apparatus.

Whether the tracking position of the face or the tracking position of the face peripheral part is adopted, a tracking frame H3 that includes both the face and the face peripheral part which are tracking targets may be displayed as shown in FIG. 17C. The tracking frame is displayed in this way, so that the user can easily visually recognize the subject which is a current tracking target.

The face region and the tracking candidate position shown in FIG. 16A to FIG. 16D may be displayed as they are. In this case, for example, as shown in FIG. 16B and FIG. 16C, the size of the tracking frame indicating the face region obtained by the face detection circuit 1305 is larger than the size of the tracking frame indicating the tracking position obtained by the face tracking circuit 1307. The size of the tracking frame indicating the tracking position obtained by the face tracking circuit 1307 may be different from the size of the tracking frame indicating the tracking position obtained by the face tracking circuit 1307. The tracking frames can be differentiated from each other by the different sizes.

The display color of the tracking frame indicating the face region obtained by the face detection circuit 1305, the display color of the tracking frame indicating the tracking position obtained by the face tracking circuit 1307, and the display color of the tracking frame indicating the tracking position obtained by the face tracking circuit 1307 may be different. The tracking frames can also be differentiated from each other by the different colors.

Thus, according to the tracking process described above, a particular tracking target desired by the user can be kept tracked by performing the tracking process using the combination of the face detection circuit 1305 and the face tracking circuit 1307. The display position of the tracking frame is switched between the face and the face peripheral part in accordance with the result of the tracking process. Thus, the user can easily visually recognize that the proper tracking process is performed.

According to the tracking process described above, the tracking process that uses the luminance information and the tracking process that uses the color information are performed in the current parts tracking process. The purpose is to improve the performance of the tracking process. In contrast, although the performance of the tracking process decreases, one of the tracking process that uses the luminance information and the tracking process that uses the color information may only be performed in the parts tracking process. As the face is tracked by the face detection circuit 1305, the tracking of the face using the face tracking circuit 1307 may be omitted.

While the present invention has been described above in connection with the embodiment, it should be understood that the present invention is not limited to the embodiment described above and various modifications and applications can be made without departing from the spirit of the invention. Although words such as "first" and "then" have been used for convenience in the above explanation of the operation, this does not mean that it is essential to perform the operation in this order.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tracking apparatus comprising:
a face detection unit which detects a face of a subject from image data containing the subject;
a face corresponding region detection unit which detects a region corresponding to the face in the image data;
a face tracking unit which tracks the face in accordance with a result detected by the face detection unit or a result detected by the face corresponding region detection unit;
a peripheral part tracking unit which tracks, as a part other than the face, a part of the subject having a preset positional relationship with the face;
a tracking switch unit which switches to the tracking of the part other than the face by the peripheral part tracking unit when the face is not tracked by the face tracking unit;
a color information detection unit which detects a region having color information corresponding to a peripheral of the image data other than the face of the subject;
a face direction determination unit which determines a direction of the face tracked by the face tracking unit; and
a color information update processing unit which updates color information corresponding to the peripheral part when the face direction determination unit determines that the tracked face is directed forward, and does not update the color information corresponding to the peripheral part when the face direction determination unit determines that the tracked face is not direction forward.

2. The tracking apparatus according to claim 1,
wherein the face corresponding region detects color information for the region corresponding to the face in the image data, and
the tracking switch unit returns to the tracking of the face by the face tracking unit from the tracking by the peripheral part tracking unit when a region at a position estimated from the position of the part other than the face is detected as the face or when the color information corresponding to the face is detected.

3. The tracking apparatus according to claim 2,
wherein the tracking switch unit previously stores the color information corresponding to the face, and when color information in the region estimated to be the face corresponds to the previously stored color information, the tracking switch unit recognizes that the color information corresponding to the face is detected and then returns to the tracking of the face by the face tracking unit.

4. The tracking apparatus according to claim 2,
wherein the face tracking unit gives priority to the detection of the face by the face detection unit over the detection of the color information by the face corresponding region detection unit.

5. The tracking apparatus according to claim 2,
wherein the tracking switch unit determines that the face is not tracked by the face tracking unit when the face is not detected by at least the face detection unit and when the color information is not detected by the face corresponding region detection unit.

6. The tracking apparatus according to claim 5,
wherein the tracking switch unit determines that the face is not tracked by the face tracking unit when the image data includes no data for the face and when the face is not tracked in accordance with the region having the color information.

7. The cracking apparatus according to claim 2,
wherein the face corresponding region detection unit detects a flesh color as the color information.

8. A tracking method comprising:
causing a face detection unit to detect a face of a subject from image data containing the subject;
causing a face corresponding region detection unit to detect a region corresponding to the face in the image data;
causing a face tracking unit to track the face in accordance with a result detected by the face detection unit or a result detected by the face corresponding region detection unit;
causing a peripheral part tracking unit to track, as a part other than the face, a part of the subject having a preset positional relationship with the face;

switching to the tracking of the part other than the face by the peripheral part tracking unit when the face is not tracked by the face tracking unit;

causing a color information detection to detect a region having color information corresponding to a peripheral part to the image data other than the face of the subject;

causing a face direction determination to determine a direction of the face tracked by the face tracking unit; and causing a color information update processing unit to update color information corresponding to the peripheral part when the face direction determination unit determines that the tracked face is directed forward, and does not update the color information corresponding to the peripheral part when the face direction determination unit determines that the tracked face is not directed forward.

9. The tracking method according to claim 8, wherein the switch of the tracking comprises returning to the tracking of the face by the face tracking unit when the face is detected in a region estimated to be the face from peripheral parts of the face or when color information for the region corresponding to the face is detected.

10. A storage medium to store a tracking program processable by a computer, the tracking program comprising:
a face detection function which detects a face of a subject from image data containing the subject;
a face corresponding region detection function which detects a region corresponding to the face in the image data;
a face tracking function which tracks the face in accordance with a result detected by the face detection function or a result detected by the face corresponding region detection function;
a peripheral part tracking function which tracks, as a part other than the face, a part of the subject having a preset positional relationship with the face;
a tracking switch function which switches to the tracking of the part other than the face by the peripheral part tracking function when the face is not tracked by the face tracking function;
a color information which detects a region having color information corresponding to a peripheral part of the image data other than the face of the subject;
a face direction determination function which determines a direction of the face tracked by the face tracking function; and
a color information update processing function which updates color information corresponding to the peripheral part when the face direction determination function determines that the tracked face is directed forward, and does not update the color information corresponding to the peripheral part when the face direction determination function determines that the tracked face is not directed forward.

11. The storage medium according to claim 10, wherein the tracking switch function returns to the tracking of the face by the face tracking function when the face is detected at a position estimated to be the face from the position of the peripheral part other than the face or when the color information for the region corresponding to the face is detected.

12. An imaging device comprising:
an imaging unit which images a subject and then outputs image data;
a face detection unit which detects a face of the subject from the image data;
a face tracking unit which tracks the face of the subject in the image data in accordance with the image data;
a peripheral part tracking unit which tracks a face peripheral part of the subject in the image data in accordance with the image data;
a display unit which displays an image based on the image data;
a control unit superposing a display frame indicating the position of the face on the image displayed on the display unit when the detection of the face by the face detection unit or the tracking of the face by the face tracking unit is effective, and superposing a display frame indicating the position of the face peripheral part on the image displayed on the display unit when the detection of the face by the face detection unit and the tracking of the face by the face tracking unit are ineffective;
a color information detection unit which detects a region having color information corresponding to a peripheral part of the image data other that the face of the subject;
a face direction determination unit which determines a direction of the face tracked by the face tracking unit; and
a color information update processing unit which updates color information corresponding to the peripheral part when the face direction determination unit determines that the tracked face is directed forward, and does not update the color information corresponding to the peripheral part when the face direction determination unit determines that the tracked face is not directed forward.

13. The imaging device according to claim 12, wherein in response to a change from a first condition in which the detection of the face by the face detection unit or the tracking of the face by the face tracking unit is effective to a second condition in which the detection of the face by the face detection unit and the tracking of the face by the face tracking unit are ineffective, the control unit stops the superposition of the display frame which indicates the position of the face and which is superposed on the display unit.

14. The imaging device according to claim 13, wherein when the detection of the face by the face detection unit and the tracking of the face by the face tracking unit are effective, the control unit superposes, on the image displayed on the display unit, a first display frame indicating the position of the face detected by the face detection unit.

15. The imaging device according to claim 13, wherein when the detection of the face by the face detection unit and the tracking of the face by the face tracking unit are effective, the control unit superposes, on the image displayed on the display unit, the first display frame indicating the position of the face detected by the face detection unit and a second display frame indicating the position of the face tracked by the face tracking unit.

16. The imaging device according to claim 13, wherein when the detection of the face by the face detection unit is ineffective and the operation of tracking the face by the face tracking unit is effective, the control unit superposes, on the image displayed on the display unit, a second display frame indicating the position of the face tracked by the face tracking unit.

17. The imaging device according to claim 12, wherein the peripheral part tracking unit tracks the face by estimating the position of a breast of the subject to be the position of the face peripheral part in accordance with the position of the face detected by the face detection unit or the position of the face tracked by the face tracking unit.

18. The imaging device according to claim 12,
wherein the face tracking unit comprises a first color tracking unit which detects color information for the image data to track the face of the subject, and
a first luminance tracking unit which detects luminance information for the image data to track the face of the subject, and
the peripheral part tracking unit comprises a second color tracking unit which detects the color information for the image data to track the face peripheral part of the subject, and
a second luminance tracking unit which detects luminance information for the image data to track the face peripheral part of the subject.

19. The imaging device according to claim 12,
wherein the control unit displays a display frame indicating the position of the face and a display frame indicating the position of the face peripheral part so that these display frames are different in size or color.

20. The imaging device according to claim 12,
wherein the control unit superposes a display frame which comprises the face and the face peripheral part on the image displayed on the display unit.

* * * * *